US012287759B1

(12) United States Patent
Baird et al.

(10) Patent No.: US 12,287,759 B1
(45) Date of Patent: Apr. 29, 2025

(54) SINGLE NAMESPACE FOR HIGH PERFORMANCE COMPUTING SYSTEM

(71) Applicant: GUARDANT HEALTH, INC., Palo Alto, CA (US)

(72) Inventors: William Patrick Baird, Orinda, CA (US); Mikhail Zhagrov, San Francisco, CA (US); Alexander David Younts, West Lafayette, IN (US); Varsha Kohirkar, Palo Alto, CA (US); Kumud Kalia, Redwood, CA (US)

(73) Assignee: Guardant Health, Inc., Palo Alto, CA (US)

( * ) Notice: Subject to any disclaimer, the term of this patent is extended or adjusted under 35 U.S.C. 154(b) by 0 days.

(21) Appl. No.: 18/926,954

(22) Filed: Oct. 25, 2024

Related U.S. Application Data

(60) Provisional application No. 63/656,184, filed on Jun. 5, 2024, provisional application No. 63/627,636, filed on Jan. 31, 2024, provisional application No. 63/593,354, filed on Oct. 26, 2023.

(51) Int. Cl.
*G06F 17/30* (2006.01)
*G06F 16/14* (2019.01)
*G06F 16/18* (2019.01)

(52) U.S. Cl.
CPC ........ *G06F 16/148* (2019.01); *G06F 16/1873* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| 6,523,027 B1 * | 2/2003 | Underwood ............ G06F 9/465 |
| 7,035,943 B2 * | 4/2006 | Yamane .............. H04L 67/1001 714/48 |
| 8,667,456 B1 * | 3/2014 | Czymontek ............... G06F 9/44 707/696 |

(Continued)

FOREIGN PATENT DOCUMENTS

KR 20210038285 A 4/2021

OTHER PUBLICATIONS

Abramson, et, al. A Cache-Based Data Movement Infrastructure for On-demand Scientific Cloud Computing, Computer Science, Engineering, Environmental Sceience, Mar. 11, 2019.

(Continued)

*Primary Examiner* — Hung D Le
(74) *Attorney, Agent, or Firm* — Timothy A. Hott

(57) ABSTRACT

A data processing architecture controls data processing arbitration in a high performance computing system that includes one or more premises. Individual premises can include one or more server computers executing an instance of a local file system and including one or more temporary data storage devices. Individual instances of the local file system can access files stored in objects of a primary data store. Individual objects of the primary data store can be accessed using a common identifier indicating a storage location of the individual objects in the primary data store.

20 Claims, 7 Drawing Sheets

(56) References Cited

U.S. PATENT DOCUMENTS

| | | | |
|---|---|---|---|
| 8,831,995 B2* | 9/2014 | Holler | H04L 63/101 |
| | | | 705/52 |
| 8,898,204 B1 | 11/2014 | Sathe et al. | |
| 9,792,298 B1* | 10/2017 | Taylor | G06F 16/1844 |
| 9,824,095 B1* | 11/2017 | Taylor | G06F 16/11 |
| 9,852,149 B1* | 12/2017 | Taylor | G06F 16/1844 |
| 10,893,106 B1 | 1/2021 | Saladi et al. | |
| 10,997,126 B1 | 5/2021 | Bent et al. | |
| 2004/0088382 A1* | 5/2004 | Therrien | G06F 11/1469 |
| | | | 709/219 |
| 2007/0260578 A1* | 11/2007 | Ghosh | G06F 16/24552 |
| 2009/0177706 A1* | 7/2009 | Takahata | G01C 21/3815 |
| 2010/0070546 A1* | 3/2010 | Meyer | G06F 16/10 |
| | | | 707/831 |
| 2010/0332452 A1 | 12/2010 | Hsu et al. | |
| 2011/0022569 A1* | 1/2011 | Debrunner | G06F 16/278 |
| | | | 707/661 |
| 2011/0029648 A1 | 2/2011 | Saika | |
| 2012/0095950 A1* | 4/2012 | Ziegler | G06Q 10/10 |
| | | | 706/47 |
| 2012/0233228 A1* | 9/2012 | Barton | G06F 16/273 |
| | | | 707/827 |
| 2014/0006354 A1* | 1/2014 | Parkison | G06F 3/0635 |
| | | | 707/661 |
| 2014/0006465 A1* | 1/2014 | Davis | G06F 16/1752 |
| | | | 707/827 |
| 2014/0013112 A1* | 1/2014 | Cidon | G06F 16/182 |
| | | | 713/165 |
| 2014/0019497 A1* | 1/2014 | Cidon | G06F 16/182 |
| | | | 707/827 |
| 2014/0201145 A1* | 7/2014 | Dorman | G06F 16/178 |
| | | | 707/634 |
| 2014/0337291 A1* | 11/2014 | Dorman | G06F 16/162 |
| | | | 707/634 |
| 2016/0253352 A1* | 9/2016 | Kluck | H04L 67/1095 |
| | | | 707/638 |
| 2016/0321291 A1* | 11/2016 | Malhotra | G06F 16/2443 |
| 2018/0089224 A1* | 3/2018 | Muthuswamy | G06F 16/13 |
| 2018/0097880 A1 | 4/2018 | Chan et al. | |
| 2018/0218114 A1 | 8/2018 | Wesselman et al. | |
| 2018/0330052 A1 | 11/2018 | Barrus | |
| 2019/0379647 A1 | 12/2019 | Li et al. | |
| 2021/0224230 A1* | 7/2021 | Jones | G06F 16/185 |
| 2021/0342297 A1 | 11/2021 | Gupta et al. | |
| 2022/0014605 A1 | 1/2022 | Ki et al. | |
| 2023/0075890 A1* | 3/2023 | Duval | G06F 16/178 |
| 2023/0409522 A1* | 12/2023 | Kashi Visvanathan | |
| | | | G06F 16/27 |

OTHER PUBLICATIONS

International Search Report and Written Opinion for International Patent Application No. PCT/US2024/052951, dated Jan. 3, 2025.

* cited by examiner

SINGLE NAMESPACE FOR HIGH PERFORMANCE COMPUTING SYSTEM

PRIORITY CLAIM

This application claims the benefit of priority to U.S. Provisional Patent Application No. 63/593,354, filed on Oct. 26, 2023, entitled "Single Namespace for Bioinformatics System," and U.S. Provisional Patent Application No. 63/627,636, filed on Jan. 31, 2024, entitled "Data Processing Abstraction for Bioinformatics System," and U.S. Provisional Patent Application No. 63/656,184, filed on Jun. 5, 2024, entitled "Data Processing Abstraction for Bioinformatics System," which are each incorporated by reference herein in their entirety.

TECHNICAL FIELD

Implementations of the present disclosure relate generally to the field of computer architectures, and more particularly to implementations of computer architectures for controlling data processing operations in various systems, such as media streaming systems, scientific research systems, bioinformatics systems, content generating systems, generative machine learning systems, and the like.

BACKGROUND

The transfer of large amounts of data and performing computations using large amounts of data can be performed by high performance computing systems. For example, bioinformatics can involve the analysis of large amounts of data in an effort to analyze causes of various biological conditions and to identify treatments for a number of biological conditions. In many cases, bioinformatics can relate to the computational analysis of genomics data. Genomics data can include nucleotide sequences of genetic material obtained from samples of individuals. Genomics data from a single individual can correspond to many megabytes of data storage space while genomics data of various cohorts of individuals can correspond to hundreds of gigabytes up to many terabytes or petabytes of data storage space. In other examples, high performance computing systems can be used in forecasting and modeling scenarios in relation to meteorological data and geological data as well as in the execution of machine learning algorithms and in fraud detection. Due to the large amounts of data accessed and analyzed by bioinformatics systems and other systems that utilize high performance computing, the storage and transfer of this data can be inefficient in terms of network resources utilized as well as result in performance lag.

DETAILED DESCRIPTION

Figure 1:
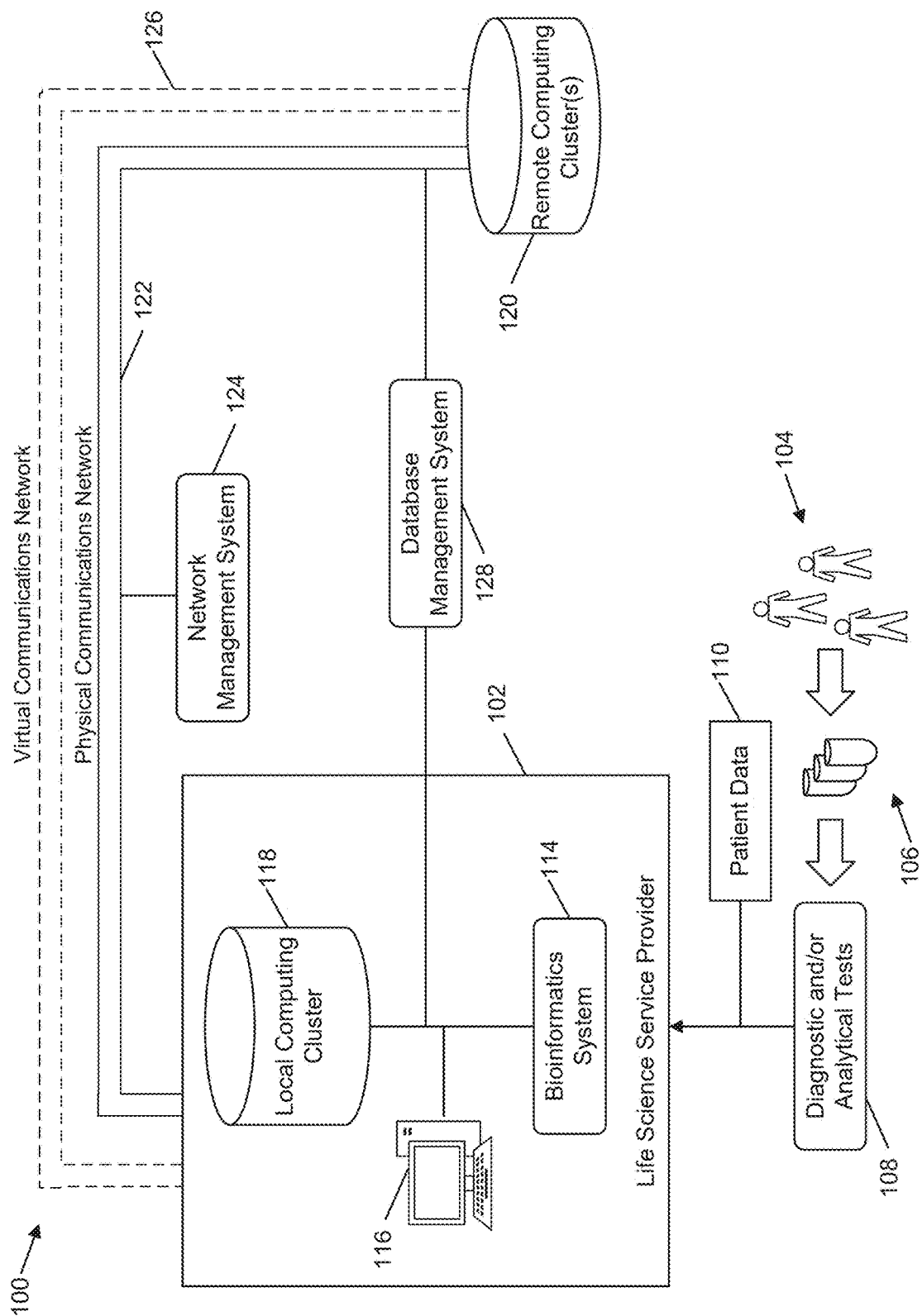
FIG. 1 illustrates an example architecture to process patient data, according to some examples.

The following description and the drawings sufficiently illustrate specific implementations to enable those skilled in the art to practice them. Other implementations may incorporate structural, logical, electrical, process, and other changes. Portions and features of some implementations may be included in, or substituted for, those of other implementations. Implementations set forth in the claims encompass all available equivalents of those claims.

Due to the large amounts of data accessed and analyzed by high performance computing systems, the storage, transfer, and processing of data can be inefficient in terms of network resources utilized as well as result in lag when performing analyses of the large amounts of data, such as scientific data, technical data, media content, bioinformatics data, and the like. Some computing architectures allow such data to be processed by remote computing engines or cloud computing systems. However, managing arbitration of data is a daunting task. Specifically, users need to manually select which data operations to process locally and which to process remotely which takes a great deal of time and effort and requires navigation through multiple pages of information. Also, having to consider whether remote resources are even available to perform the requested operations and/or can perform the requested operations under cost constraints is difficult and time consuming particularly because the availability and cost can vary over time. Finally, sometimes the data that needs to be processed includes sensitive and private information. Managing how such data is processed adds another level of time and expense which reduces the overall security and efficiencies of conventional systems.

Data movement, curation and management has been a problem since the first computers were created. With the use of multiple high performance computing clusters, cloud assets, remote sites, and multiple storage technologies, a variety of complex tools have been created to track, reconcile, retrieve, and manage the data a site or project produces. These often require additional resources to manage as specialists rather than the standard system teams and require dedicated or collaborative teams to develop and maintain. In addition, this also requires extensive training for users to locate, retrieve and archive their data as these systems are file system specific and cannot be leveraged by any other type of file system.

The disclosed techniques address these shortcomings by providing a data processing controller that can automatically and intelligently arbitrate between executing data processing operations locally and/or remotely using various computing clusters. Specifically, the disclosed techniques store, by a data processing controller on a centralized server, a plurality of files in a standardized format and receive, from a first computing system, a first request to access a first file of the plurality of files, the first computing system generating the request using a first type of file system. The disclosed techniques receive, from a second computing system, a second request to access a second file of the plurality of files, the second computing system generating the request using a second type of file system different from the first type of file system of the first computing system. The disclosed techniques control access to the first and second files in response to receiving the first and second requests.

In this way, data processing operations can be executed and performed more efficiently and with minimal user effort and interaction. Also, files stored on a centralized server can be accessed by any type of file system which creates a single namespace for the files that is file system agnostic. This allows users with a variety of user interfaces and operating system they are trained to operate to access a collection of files that are centralized stored and managed using those disparate operating systems and user interfaces. This increases the overall efficiencies of operating a device.

FIG. 1 illustrates an example architecture 100 to manage and arbitrate between processing data locally or remotely using local and/or remote computing clusters, according to some examples. The architecture 100 can include a life science service provider 102 and can be used to provide high-performance computing services for the life science service provider 102. High performance computing systems can include clusters of processors that can perform calculations in a massively parallel manner. In at least some examples, high performance computing systems can perform calculations and transfer amounts of data that are hundreds of times, thousands of times, up to millions of times greater than typical desktop, laptop, or server systems. High performance computing systems can perform computations using thousand, up to tens of thousands, up to millions of processors and can perform up to quintillions of floating point operations per second. The life science service provider 102 can include an entity that provides at least one of products or services to individuals. The life science service provider 102 can include at least one of an educational organization, a non-profit organization, a privately owned business, or a publicly owned business. In one or more examples, the life science service provider 102 can include an entity that develops treatments for one or more biological conditions. For example, the life science service provider 102 can include a pharmaceutical company that develops and/or manufactures pharmaceutical substances to treat one or more biological conditions.

In some examples, the life science service provider 102 can include a diagnostics organization that develops tests to detect the presence of one or more biological conditions in subjects. The life science service provider 102 can also include a medical device entity that develops and/or manufactures medical devices to at least one of treat or detect one or more biological conditions. Further, the life science service provider 102 can include an organization that develops or manufactures equipment, devices, supplies, and/or a combination thereof used in the detection and/or treatment of one or more biological conditions. In some examples, the life science service provider 102 can include a medical services provider that provides testing, medical services, and/or treatment with regard to one or more biological conditions. In various examples, the life science service provider 102 can include one or more healthcare providers.

As used herein, a healthcare provider may refer to an entity, individual, or group of individuals involved in providing care to individuals in relation to at least one of the treatment or prevention of one or more biological conditions. In addition, as used herein, a biological condition can refer to an abnormality of function and/or structure in an individual to such a degree as to produce or threaten to produce a detectable feature of the abnormality. A biological condition can be characterized by external and/or internal characteristics, signs, and/or symptoms that indicate a deviation from a biological norm in one or more populations. A biological condition can include at least one of one or more diseases, one or more disorders, one or more injuries, one or more syndromes, one or more disabilities, one or more infections, one or more isolated symptoms, or other atypical variations of biological structure and/or function of individuals.

A treatment, as used herein, can refer to a substance, procedure, routine, device, and/or other intervention that can be administered or performed with the intent of alleviating one or more effects of a biological condition in an individual. In some examples, a treatment may include a substance that is metabolized by the individual. The substance may include a composition of matter, such as a pharmaceutical composition. The substance may be delivered to the individual via a number of methods, such as ingestion, injection, absorption, or inhalation. A treatment may also include physical interventions, such as one or more surgeries.

In at least some examples, the life science service provider 102 may at least one of store, access, process, and/or analyze data that corresponds to a number of subjects 104. In one or more examples, samples 106 may be extracted from the subjects 104. The samples 106 may be derived from at least one of bodily fluid or tissue obtained from the subjects 104. The samples 106 may be subjected to at least one of one or more diagnostic tests or one or more analytical tests at operation 108. In various examples, the one or more diagnostic tests and/or the one or more analytical tests performed at operation 108 may be performed to detect one or more biological conditions that may be present in the subjects 104. In some examples, the at least one of one or more diagnostic tests or one or more analytical tests (also referred to as data processing operations) performed at operation 108 may include one or more assays that are related to the detection of one or more forms of cancer.

The one or more diagnostic tests and/or one or more analytical tests performed at operation 108 may generate patient data 110. The patient data 110 may include data derived from the one or more diagnostic tests and/or analytical tests performed at operation 108. For example, the patient data 110 may include genomic information, genetic information, metabolomic information, transcriptomic information, fragmentiomic information, immune receptor information, methylation information, epigenomic information, proteomic information, Immunohistochemistry (IHC), and immunofluorescence (IF), and/or Personal Identifiable Information (PII). PII can include information that, when used alone or with other relevant data, can identify an individual. PII may contain direct identifiers (e.g., passport information) that can identify a person uniquely, or quasi-identifiers (e.g., race) that can be combined with other quasi-identifiers (e.g., date of birth) to successfully recognize an individual. PII can include sensitive personally identifiable information, such as a full name, Social Security Number, driver's license, financial information, and/or medical records.

As used herein, "fragmentomic information" may include, among other things, information related to the analysis of the length of DNA or RNA fragments to determine the presence or absence of a tumor and to determine characteristics of the tumors. In at least some examples, the fragmentiomic information can correspond to nucleosomal structure and transcription factor binding sites. In some examples, fragmentiomic information can include fragment endpoint density, plasma DNA sizes, endpoints, nucleosome footprints, the DNA fragments that align with base positions in the genome, the number of DNA fragments that start or end at specific base positions in the genome, fragment starts and length associated with specific conditions, heterogeneous patterns of cfDNA positioning in cancer, nucleosomal occupancy, nucleosome dynamics, chromatin organization, structure, and function, chromatin states, consequence of genomic aberrations, and/or epigenetic changes in DNA associated with health and disease.

In some examples, "genomic information" can correspond to nucleic acid sequences derived from the samples 106. The genomic information may indicate one or more mutations corresponding to genes of the subjects 104. A mutation to a gene of the subjects 104 may correspond to differences between a sequence of nucleic acids of the subjects 104 and one or more reference genomes. The reference genome may include a known reference genome, such as hg19. In various examples, a mutation of a gene of a subject 104 may correspond to a difference in a germline gene of a subject 104 in relation to the reference genome. In some examples, the reference genome may include a germline genome of a subject 104. In one or more further examples, a mutation to a gene of a subject 104 may include a somatic mutation. Mutations to genes of subjects 104 may be related to insertions, deletions, single nucleotide variants, loss of heterozygosity, duplication, amplification, translocation, fusion genes, or one or more combinations thereof. In at least some examples, the genomic information can correspond to non-coding regions of a genome. The non-coding regions can be related to the regulation of one or more genes. In one or more examples, the analysis of the non-coding regions can detect one or more epigenetic signatures of one or more patients.

In some examples, genomic information included in the patient data 110 may include genomic profiles of tumor cells present within one or more subjects 104. In these situations, the genomic information may be derived from an analysis of genetic material, such as deoxyribonucleic acid (DNA) and/or ribonucleic acid (RNA), found in blood samples of one or more subjects 104 that is present due to the degradation of tumor cells present in the one or more subjects 104. In some examples, the genomic information of tumor cells of one or more subjects 104 may correspond to one or more target regions. One or more mutations present with respect to the one or more target regions may indicate the presence of tumor cells in one or more subjects 104.

In some examples, the genetic material analyzed to generate the genomic information may be derived from one or more samples 106, including, but not limited to, a tissue sample or tumor biopsy, circulating tumor cells (CTCs), exosomes or efferosomes, or from circulating nucleic acids. In various examples, the circulating nucleic acids may be referred to herein as "cell-free DNA." "Cell-free DNA," "cfDNA molecules," or simply "cfDNA" include DNA molecules that occur in a subject 104 in extracellular form (e.g., in blood, serum, plasma, or other bodily fluids such as lymph, cerebrospinal fluid, urine, or sputum) and includes DNA not contained within or otherwise bound to a cell at the point of isolation from the subject 104. While the DNA originally existed in a cell or cells of a large complex biological organism (e.g., a mammal) or other cells, such as bacteria, colonizing the organism, the DNA has undergone release from the cell(s) into a fluid found in the organism. cfDNA includes, but is not limited to, cell-free genomic DNA of the subject 104 (e.g., a human subject's genomic DNA) and cell-free DNA of microbes, such as bacteria, inhabiting the subject 104 (whether pathogenic bacteria or bacteria normally found in commonly colonized locations such as the gut or skin of healthy controls), but does not include the cell-free DNA of microbes that have merely contaminated a sample of bodily fluid. Typically, cfDNA may be obtained by obtaining an amount of the fluid without the need to perform an in vitro cell lysis step and also includes removal of cells present in the fluid (e.g., centrifugation of blood to remove cells).

In some examples, the patient data 110 may include information about the subjects 104 (e.g., PII). Specifically, the patient data 110 may include identifiers of the subjects 104, physical characteristics of the subjects 104 (e.g., weight, height), age of the subjects 104, personal information of the subjects 104, ethnic background of the subjects 104, one or more combinations thereof, and so forth. Further, the patient data 110 may include medical records that correspond to the patient data 110. To illustrate, medical records of the subjects 104 may accompany the patient data 110 and/or be generated in conjunction with the patient data 110. Medical records may include imaging information, laboratory test results, diagnostic test information, clinical observations, dental health information, notes of healthcare practitioners, medical history forms, diagnostic request forms, medical procedure order forms, medical information charts, one or more combinations thereof, and so forth. Medical records may also indicate lifestyle information, such as smoking status, alcohol consumption, sleep habits, one or more combinations thereof, and the like. Any of this information can be characterized as PII or, more generally, as private information.

The life science service provider 102 may include a bioinformatics system 114 that performs one or more data processing operations to analyze at least one of the patient data 110. The bioinformatics system 114 may implement one or more statistical techniques to analyze at least one of the patient data 110. In some examples, the bioinformatics system 114 may implement one or more machine learning techniques (or machine learning models (MLs)) to perform the data processing operations to analyze at least one of the patient data 110. In various examples, the bioinformatics system 114 may analyze at least one of the patient data 110 to determine characteristics of subjects 104 in which a biological condition is present. For example, the bioinformatics system 114 may analyze at least one of the patient data 110 to determine one or more genomic features of at least a portion of the subjects 104 in which at least one form of cancer is present. The disclosed examples provide a data processing controller (which can be implemented locally by one or more local computing clusters and/or remotely by one or more cloud computing clusters that are remote from the local computing clusters).

The data processing controller can store the patient data 110 and/or a variety of other data used by the bioinformatics system 114 in a centrally managed way. Specifically, the data processing controller can be implemented by one or more cloud computing clusters or servers and can store the patient data 110 and/or the variety of other data in one or more files or a plurality of files. The files can be stored in a standardized format or a format compatible with the operating system or file system of the data processing controller. The data processing controller can maintain various metadata or data objects in association with each file system. The data objects indicate the specific storage location of the file system on the cloud computing cluster, a lock status of each file (e.g., indicating whether the file is currently in use by a client computing system), and changes associated with the file. The files stored by the cloud computing cluster can act as the source of truth versions of the files.

Each computing system can implement a different type of file system or operating system and can present a different type of user interface. The computing systems can communicate with the data processing controller on the cloud computing cluster or server to obtain access to certain files of the plurality of files that are stored by the cloud computing cluster. The data processing controller can receive a request for an individual file and can access the data objects associated with the file in response to receiving the request from an individual computing system. The data processing controller can retrieve the individual file based on the storage location indicated in the one or more data objects. The data processing controller can also determine whether the file is currently in use based on the one or more data objects. The data processing controller can then control access to the file by the computing system based on retrieving the individual file and based on whether the file is currently being accessed by another computing system.

If the individual file is currently in use by another computing system, the data processing controller can prevent access to the individual file and inform the requesting computing system that the individual file is currently in use. As an alternatively, the data processing controller can access a cache of the other computing system that is currently using the file to determine changes associated with the file. The data processing controller can then update the individual file and generate a copy of the updated individual file. The data processing controller can then provide the copy of the individual file to the requesting computing system. The data processing controller can track changes made by each computing system that is currently accessing the same file in the one or more data objects, such as by periodically requesting the updates that are stored in respective caches on the computing systems. The data processing controller can periodically merge the changes stored in the one or more data objects to the copy of source of truth version of the file that was accessed by multiple computing systems.

In some examples, the data processing controller can stream the individual file to the requesting computing system. The requesting computing system can store a copy of the individual file in a local cache and can convert the file from the standardized format to a format associated with the file system of the requesting computing system. The requesting computing system can then present contents of the individual file on a user interface of the requesting computing system. The requesting computing system can track changes made to the individual file in the local cache. The requesting computing system can upload the changes that are tracked from the local cache to the one or more objects managed and stored by the data processing controller on the cloud computing cluster. After verifying the changes, the data processing controller can update the source of truth version of the file based on the changes stored in the respective objects associated with the individual file.

In some examples, the bioinformatics system 114 may analyze at least one of the patient data 110 to identify one or more cohorts that correspond to a number of groups of the subjects 104. In some examples, the bioinformatics system 114 may analyze at least one of the patient data 110 to determine an effectiveness of one or more treatments provided to at least a portion of the subjects 104 in relation to one or more biological conditions present in a group of the subjects 104. Additionally, the bioinformatics system 114 may analyze at least one of the patient data 110 to determine a recommendation for a treatment for at least a portion of the subjects 104 in relation to one or more biological conditions present in a group of the subjects 104. Further, the bioinformatics system 114 may analyze at least one of the patient data 110 to determine an amount of progression of a biological condition present in at least a portion of the subjects 104. In at least some examples, the bioinformatics system 114 may analyze at least one of the patient data 110 to determine a biological condition that is present in at least a portion of the subjects 104. In some examples, the bioinformatics system 114 may analyze at least one of the patient data 110 to determine a diagnosis for at least a portion of the subjects 104.

The life science service provider 102 may include one or more computing devices 116 that may access the bioinformatics system 114. The one or more computing devices 116 may include at least one of one or more desktop computing devices, one or more laptop computing devices, one or more tablet computing devices, one or more mobile computing devices, one or more smart phones, one or more wearable computing devices, or one or more combinations thereof. The life science service provider 102 may also include and/or be coupled to a local computing cluster 118. In one or more examples, the local computing cluster 118 may include one or more data stores and servers or computer systems that are located on at least one site of the life science service provider 102. In various examples, the local computing cluster 118 may be coupled to at least one of the one or more computing devices 116 or the bioinformatics system 114 via one or more physical network connections that are at least one of maintained, controlled, or managed by the life science service provider 102. The local computing cluster 118 may store and process at least one of at least a portion of the patient data 110 (referred to as a batch of data). In some cases, the local computing cluster 118 can be physically located remotely from the computing device 116 but may be coupled securely via physical wires and an internal network that are exclusively associated with the life science service provider 102. Each local computing cluster 118 can represent an individual one of the computing systems that access the cloud computing system or server managed by the data processing controller.

In some examples, the life science service provider 102 may be in communication with a remote computing cluster(s) 120 (also referred to as a cloud computing cluster or cloud cluster). The remote computing cluster(s) 120 may be located off-site with respect to one or more locations of the life science service provider 102 and be at least one of controlled, maintained, or managed by an entity different from the life science service provider 102 (e.g., a third-party entity relative to the life science service provider 102). In one or more examples, the remote computing cluster(s) 120 may be at least one of controlled, maintained, or managed by one or more third-party cloud . . . computing service providers. Specifically, the cluster(s) 120 can include a first set of computing clusters or systems provided by a first entity that is a third-party relative to the life science service provider 102 and can include a second set of computing clusters or systems provided by a second entity that is a third-party relative to the life science service provider 102. The first set of computing clusters can be associated with a different set of cost and resources available to the life science service provider 102 than the second set of computing clusters.

In some examples, the first set of computing clusters of systems can implement a first type of file system running on a first type of operating system and the second set of computing clusters of systems can implement a second type of file system running on a second type of operating system. Even though the first and second sets of computing clusters operate using different types of file systems, the first and second sets of computing clusters can share access to and receive files stored on the centralized computing system. To do so, the first and second sets of computing clusters can implement conversion engines to convert the files from the standardized format of the centralized computing system to the respective file formats of the first and second sets of computing clusters.

In various examples, the local computing cluster 118 and/or the remote computing cluster(s) 120 may store at least one of a portion of the patient data 110. In some cases, a batch of data including the patient data 110 can be stored in a centralized location, such as by one or more of the clusters 120. A link to the batch of data can be generated and made available to the computing device 116. The link can be used by the computing device 116 to instruct the local computing cluster 118 and/or the cluster(s) 120 to perform one or more data processing operations. Namely, a data processing controller can instruct any combination of the local computing cluster 118 and the cluster(s) 120 to perform or execute the one or more operations using the link. This can minimize the bandwidth and time it takes to move data around for processing. For example, rather than sending the batch of data from one device over a network to another, the data processing controller can send a link to the batch of data to the computing cluster that is selected to perform the data processing operations. Then, the computing cluster can retrieve the batch of data from the centralized storage using the link which expedites the processing of such data. After the batch of data completes being processed, the results or processed data is provided back to the centralized storage (which can be implemented by the cluster(s) 120) to be made available to other computing clusters.

The life science service provider 102 may be in communication with the remote computing cluster(s) 120 via a physical communications network 122. The physical communications network 122 may include communications network infrastructure that is one of controlled, maintained, or managed by an entity other than the life science service provider 102. The cluster(s) 120 can be publicly accessible over the Internet to multiple parties and can perform operations simultaneously for multiple parties or entities and is not exclusively associated with the life science service provider 102. For example, the physical communications network 122 may include physical networking equipment that is at least one of controlled, maintained, or managed by a network management system 124 of a network services provider. The network management system 124 may control network resources utilized by a number of different entities that utilize the physical communications network 122 for the transfer, process, and/or access of data. For example, the network management system 124 may allocate bandwidth and/or processing resources of the physical communications network 122 for entities that use the physical communications network 122 for at least one of the transfer, process, or access of data, where bandwidth corresponds to an amount of network resources allocated to one or more entities. The network management system 124 may also implement one or more techniques and/or protocols to facilitate the efficient transfer of data between endpoints of the physical communications network 122.

In some examples, a virtual communications network 126 may couple the life science service provider 102 with the remote computing cluster(s) 120. The virtual communications network 126 may correspond to a portion of the physical communications network 122 that is allocated to the life science service provider 102 at a given time. To illustrate, various portions of the network resources of the physical communications network 122 may be allocated to a number of different entities at a given time. In at least some examples, the amount of network resources of the physical communications network 122 that are dedicated to the virtual communications network between the remote computing cluster(s) 120 and the life science service provider 102 may change over time. In one or more illustrative examples, the bandwidth of the virtual communications network 126 may be modified according to the amounts of data to be transferred between the remote computing cluster(s) 120 and the life science service provider 102. The architecture 100 may also include a database management system 128. The database management system 128 may be coupled to the remote computing cluster(s) 120 and to the local computing cluster 118. In one or more examples, the computing device 116 may access data stored by the local computing cluster 118 and the remote computing cluster(s) 120 using the database management system 128. In various examples, the database management system 128 may facilitate the access of at least one of files or objects stored by the local computing cluster 118 and the remote computing cluster(s) 120 in response to requests generated by at least one of the computing devices 116 or the bioinformatics system 114.

The life science service provider 102 may utilize memory resources of one or more cloud memory storage providers to store at least one of a portion of the patient data 110 in the remote computing cluster(s) 120. In one or more examples, the life science service provider 102 may obtain and/or generate amounts of data that may exceed the capacity of the local computing cluster 118. In these scenarios, the excess data may be stored by the remote computing cluster(s) 120. Additionally, at least one of at least a portion of patient data 110 may be stored by the remote computing cluster(s) 120 for other reasons, such as the storage of medical records information to be in compliance with one or more regulatory frameworks. In one or more additional examples, at least one of at least a portion of patient data 110 may be stored by the remote computing cluster(s) 120 to minimize cost and/or increase efficiency in regard to the storage and retrieval of information by the life science service provider 102.

In at least some examples, the memory resources to store the patient data 110 may be greater than the memory resources to store other data. In various examples, the memory resources to store the patient data 110 may be two times greater, five times greater, ten times greater, twenty times greater, 50 times greater, up to 100 times greater, up to 1000 times greater, up to 10,000 times greater, up to 100,000 times greater, or more than the memory resources to store other data. In one or more illustrative examples, the patient data 110 may include DNA sequences and expression values for a number of genomic regions with respect to an individual patient, such as tens of genomic regions, hundreds of genomic regions, or thousands of genomic regions, and may consume up to hundreds of gigabytes of memory resources. In one or more additional illustrative examples, the patient data 110 for an individual patient may include sample identifiers, batch information, and patient characteristics that can be stored in text files that consume on the order of hundreds of kilobytes of memory resources, although in at least some instances, the amount of memory resources used to store patient data 110 for an individual patient can be greater, such as on the order of tens of megabytes to hundreds of megabytes or more.

In one or more examples, the local computing cluster 118 may store a first collection of the patient data 110 and the remote computing cluster(s) 120 may store a second collection of the patient data 110. In some examples, the local computing cluster 118 may include cache memory that stores at least a portion of the patient data 110 while an analysis of at least one of the patient data 110 is performed by the bioinformatics system 114.

In various examples, the computing device 116 may be used to generate a request to at least one of transfer, process, and/or access at least a portion of the patient data 110 from centralized storage. The request to at least one of transfer, process, and/or access at least a portion of the patient data 110 may be generated to analyze at least a portion of the patient data 110 (e.g., a batch of data) using the bioinformatics system 114. In some examples, a request may be generated according to one or more application programming interface (API) calls of the database management system 128 to at least one of transfer, process, and/or access at least a portion of the patient data 110. In some cases, the request to process the batch of data is routed to or processed by a data processing controller 202, shown in FIG. 2. The data processing controller 202 can be implemented by the computing devices of the life science service provider 102 and/or by computing devices of the cluster(s) 120. The data processing controller 202 can select a computing cluster (which can include any combination of the local computing cluster 118 and/or the cluster(s) 120) to execute the operations on the batch of data. In some examples, the data processing controller 202 can perform the selection of the computing cluster based on a determination of whether the batch of data includes sensitive or private information (e.g., PII). For example, in response to determining that the batch of data includes sensitive or private information, the data processing controller 202 can prevent the batch of data from being processed by the cluster(s) 120 and can ensure that the batch of data is exclusively processed by the local computing cluster 118.

Figure 2:
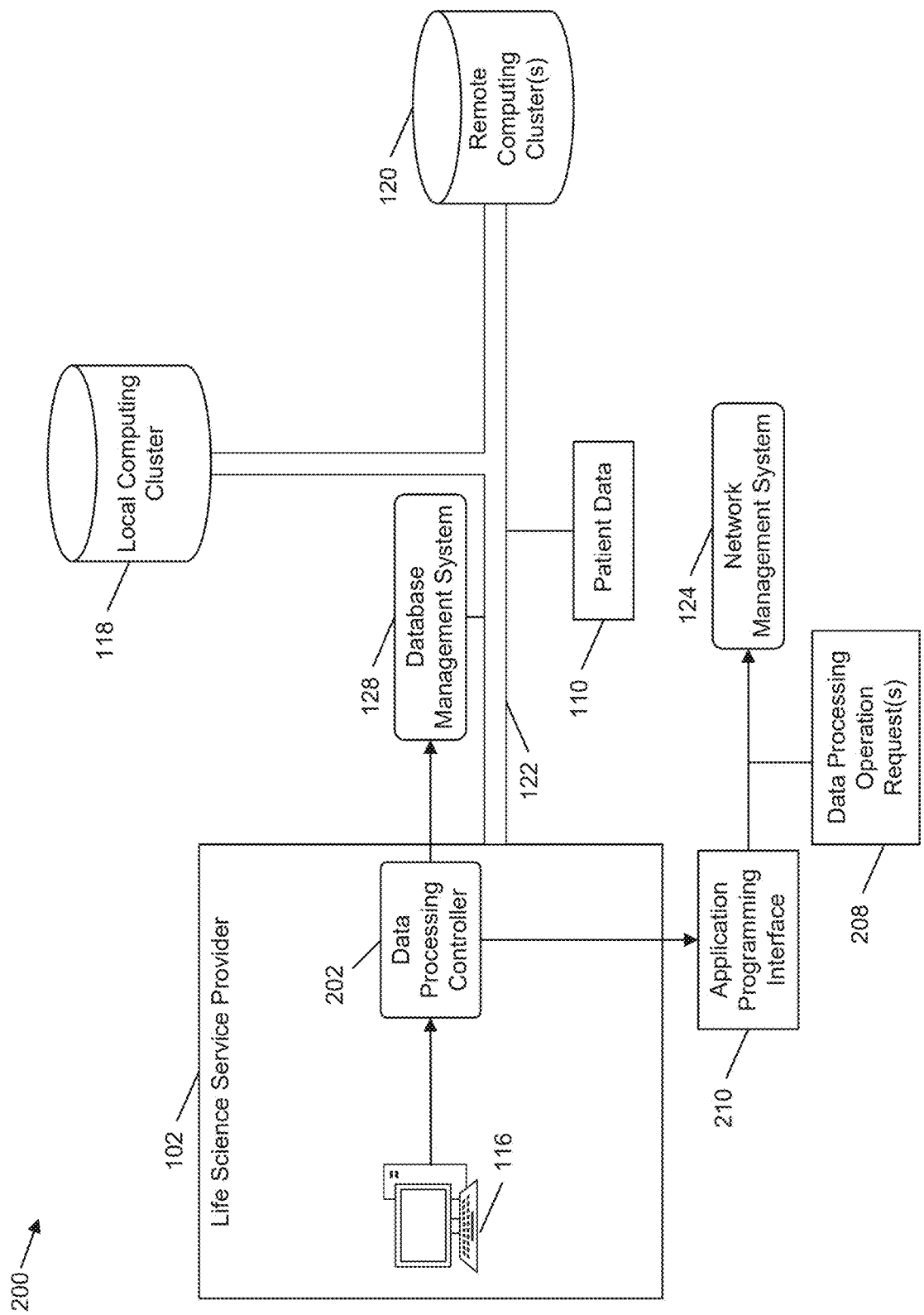
FIG. 2 illustrates an example framework to increase the allocation of network resources during the transfer of patient data from local and remote data repositories, according to some examples.

FIG. 2 illustrates an example framework 200 to arbitrate data processing operations between local and remote computing clusters, according to some examples. The framework 200 may include the life science service provider 102, the computing device 116, the local computing cluster 118, the remote computing cluster(s) 120, the physical communications network 122, the network management system 124, and the database management system 128 described with respect to FIG. 1. In the illustrative example of FIG. 2, the life science service provider 102 includes a data processing controller 202 that monitors requests to process data received from the computing device 116. In some examples, the data processing controller 202 may analyze the requests to determine whether such requests include or are associated with batches of data that include sensitive or private information (e.g., PII). To enhance security and ensure privacy remains intact, the data processing controller 202 selectively arbitrates data processing operations between the local computing cluster 118 and the cluster(s) 120 based on whether such data processing requests include or are associated with batches of data that include sensitive or private information (e.g., PII).

The data processing controller 202 can receive a request to perform one or more data processing operations for a batch of data stored in a first file of a plurality of files that are centrally stored and managed by a cloud computing system or server. In some examples, the batch of data includes patient data including genomic information of a number of subjects. In some examples, the data processing operations include performing, by a bioinformatics system 114 implemented by the selected computing cluster, an analysis of at least a portion of the batch of data and determining, based on performing the analysis, one or more characteristics of subjects that correspond to the at least the portion of the batch of data. In some examples, the one or more characteristics include one or more genomic mutations present in nucleic acids derived from samples obtained from one or more subjects and the nucleic acids correspond to cell-free deoxyribonucleic acid (DNA) extracted from bodily fluid samples obtained from the one or more subjects. In some examples, the one or more characteristics include developing resistance to a treatment provided to one or more subjects in conjunction with a biological condition present in the one or more subjects. In some examples, the biological condition corresponds to a form of cancer. In some examples, the analysis includes determining a recommendation for a treatment to provide to one or more subjects to treat a biological condition present in the one or more subjects.

In some examples, the data processing controller 202 stores, on a centralized server, a plurality of files in a standardized format. The data processing controller 202 receives, from a first computing system (e.g., local computing cluster 118), a first request to access a first file of the plurality of files, the first computing system generating the request using a first type of file system. The data processing controller 202 receives, from a second computing system (e.g., cluster(s) 120), a second request to access a second file of the plurality of files, the second computing system generating the request using a second type of file system different from the first type of file system of the first computing system. The life science service provider 102 controls access to the first and second files in response to receiving the first and second requests. Any operation discussed herein as performed by the data processing controller 202 can be performed by any other component, such as local computing cluster 118, cluster(s) 120, database management system 128, and so forth.

In some aspects, the data processing controller 202 identifies the first file storage location on the centralized server using data objects or other information stored in association with the first file. The data processing controller 202 retrieves the first file and stores an indication in the data objects associated with the first file that the first file is currently accessed by the first computing system. The data processing controller 202 then streams the first file to the first computing system which stores the first file in a local cache of the first computing system. The first computing system can convert the first file from the standardized format to a format compatible with the first type of file system. The first computing system tracks changes to the first file in the cache of the first computing system, such as based on interactions a user makes with presentation of the first file by an application (e.g., a user interface) of the first computing system.

In some aspects, the first computing system updates the one or more objects stored on the centralized server associated with the first file based on the changes to the first file in the cache of the first computing system. The first file stored on the centralized server represents a source of truth version of the first file. In response to receiving the updates from the first computing system, the data processing controller 202 can verify the changes and can periodically update the source of truth version of the first file. The data processing controller 202 can also determine whether the first file is currently accessed by another computing system, such as the second computing system. This can be performed by the data processing controller 202 querying a lock file or other data objects associated with the first file that indicate where the first file is currently being accessed.

In some examples, if the first file is currently being accessed also by the second computing system, the data processing controller 202 can transmit the changes stored in the one or more objects (based on the changes received from the cached copy of the file from the first computing system) to the second computing system. The second computing system can then update the locally cached copy of the first file and continue performing presenting the first file and tracking modifications of the first file.

In some examples, the data processing controller 202 can prevent multiple computing systems from accessing the same file based on the lock status stored in the one or more objects associated with the file. For example, after the first computing system requests access to the first file, the data processing controller 202 stores an indication in the objects that the first file is currently locked and in use by the first computing system. Later, the data processing controller 202 can receive a request from the second computing system to access the first file. The data processing controller 202 can query the data objects associated with the first file to determine that the first file is currently in use by the first computing system. In response, the data processing controller 202 can notify the second computing system that the first file is currently in use and prevent access to the first file by the second computing system. Alternatively, the data processing controller 202 can query the first computing system as to whether the first computing system has completed access to the first file. If so, the data processing controller 202 can receive the changes to the first file stored in the cache from the first computing system. In response to updating the data object representing the changes stored in the cache of the first computing system, the first computing system can delete the cache of the first file and/or delete any changes that have already been communicated to the data processing controller 202 from the cache. For example, each time one or more changes are sent from the cache of the first computing system to the data processing controller 202, the first computing system deletes those changes from the cache and starts storing new changes to the cache. This reduces overhead in the amount of data that is sent over the network to the data processing controller 202.

The data processing controller 202 updates the source of truth first of the first file and then streams the updated first file to the second computing system. The data processing controller 202 updates the lock status to now indicate that the first file is being accessed by the second computing system instead of the first computing system. The lock file can store a history of access patterns indicating when and which computing systems accessed each associated file.

In some examples, the data processing controller 202 determines that the second computing system is associated with a higher priority than the first computing system. In such cases, the data processing controller 202 can automatically retrieve the changes to the first file stored in the cache from the first computing system and remove the lock status associated with the first computing system. The data processing controller 202 updates the source of truth first of the first file and then automatically streams the updated first file to the second computing system. The data processing controller 202 updates the lock status to now indicate that the first file is being accessed by the second computing system instead of the first computing system.

Figure 3:
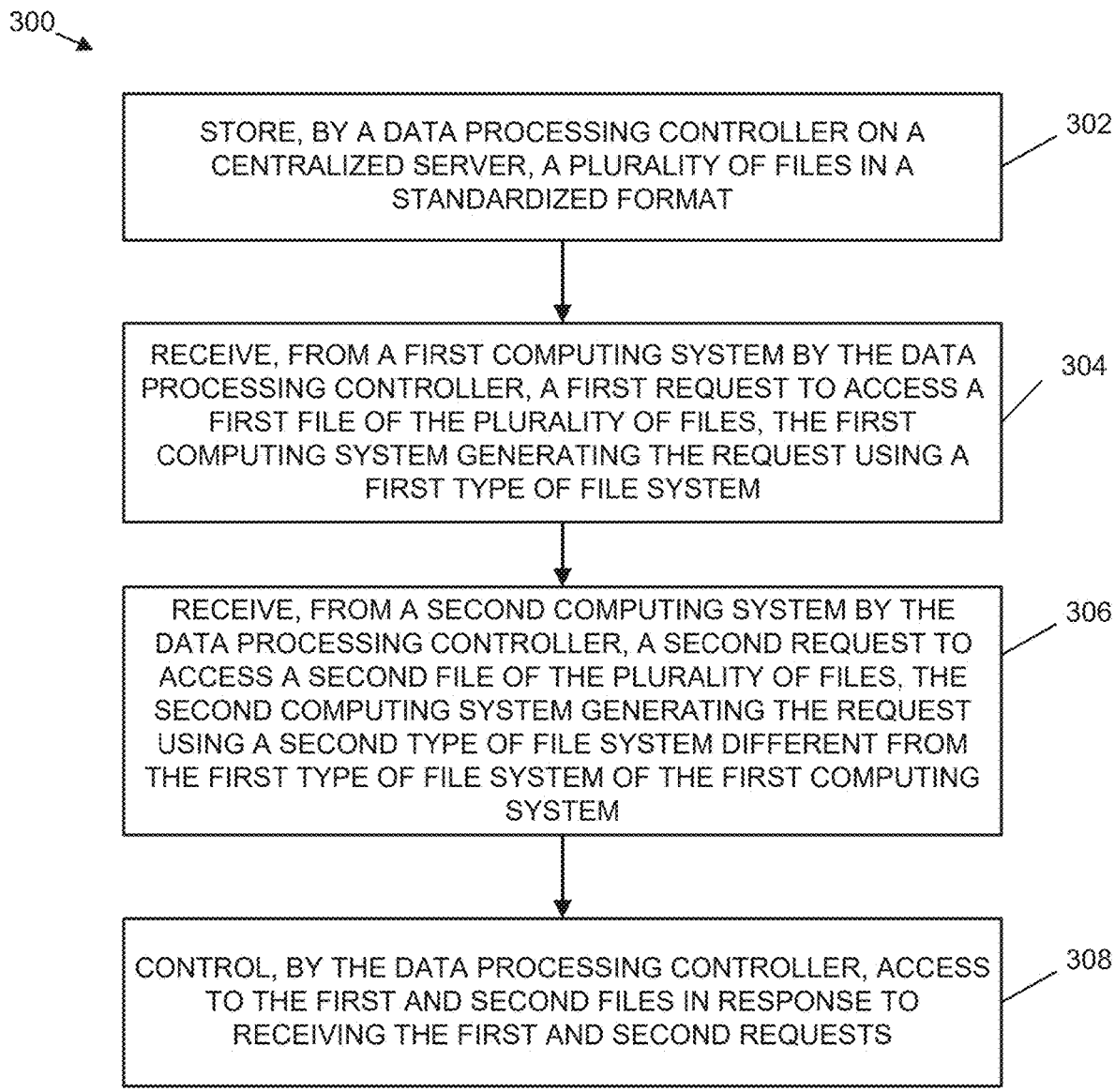
FIG. 3 is a flow diagram of an example method to efficiently process patient data using a combination of local and remote data processing resources, according to some examples.

FIG. 3 is a flow diagram of an example method 300 (or process) to arbitrate between processing data using local and/or remote computing clusters, according to some examples. At operation 302, the method 300 may include storing, by a data processing controller 202 on a centralized server, a plurality of files in a standardized format. At operation 304, the data processing controller 202 receives, from a first computing system, a first request to access a first file of the plurality of files, the first computing system generating the request using a first type of file system. At operation 306, the data processing controller 202 receives, from a second computing system, a second request to access a second file of the plurality of files, the second computing system generating the request using a second type of file system different from the first type of file system of the first computing system. At operation 308, the data processing controller 202 controls access to the first and second files in response to receiving the first and second requests.

Figure 4:
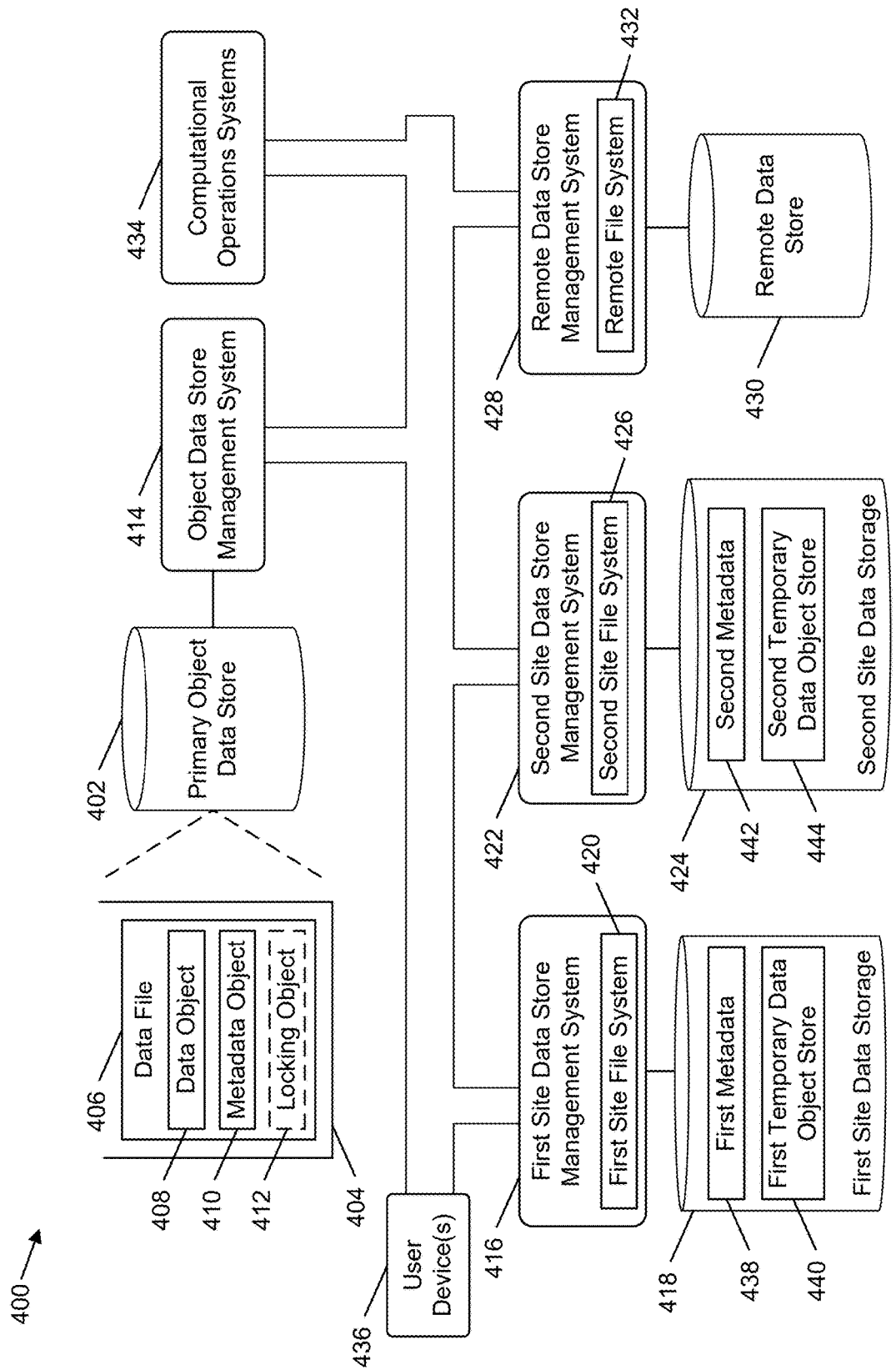
FIG. 4 illustrates an example computational architecture to store, retrieve, and modify data in a high performance computing environment, according to some examples.

FIG. 4 illustrates an example computational architecture 400 to store, retrieve, and modify data in a high performance computing environment, according to some examples. The computational architecture 400 can be implemented with respect to a service provider, an academic institution, a non-profit entity, a research entity, a commercial business, or one or more combinations thereof. In various examples, at least a portion of the components, devices, systems, and/or data stores of the computational architecture 400 can be at least one of controlled, maintained, or administered by a single entity. Additionally, various components, devices, systems, and/or data stores of the computational architecture 400 can be at least one of controlled, maintained, or administered by different entities.

In one or more illustrative examples, the data and metadata stored, analyzed, and communicated by the computational architecture 400 can be generated by a number of sensors and include meteorological data, molecular data, transportation related data, such as data generated by autonomous vehicle sensors, geological data, genetics data, data generated by one or more diagnostics tests, data generated by one or more medical devices, and so forth. In one or more additional illustrative examples, the data stored, analyzed, and communicated by the computational architecture 400 can also include media content, communications data, financial data, scientific data, and the like. The metadata can include timing information related to the data, source information related to the data, identification information, prioritization information, destination information, parameters used in generating the data, and so forth. In one or more additional illustrative examples, the stored, analyzed, and communicated by the computational architecture 400 can be related to patients being at least one of tested for or treated for one or more biological conditions.

High performance computing systems can include clusters of processors that can perform calculations in a massively parallel manner. In at least some examples, high performance computing systems can perform calculations and transfer amounts of data that are hundreds of times, thousands of times, up to millions of times greater than typical desktop, laptop, or server systems. High performance computing systems can perform computations using thousand, up to tens of thousands, up to millions of processors and can perform up to quintillions of floating point operations per second. Additionally, data to be read from or written to high performance computing systems can be on the order of petabytes and exabytes. In high performance computing systems, the movement of data to storage devices can be offloaded from or performed separately with respect to systems that are performing computational operations in relation to the data. In this way, high performance computing systems can efficiently read and write data to storage devices while devoting additional computational resources to performing computations with respect to data.

The computational architecture 400 can include a primary object data store 402 that includes a number of data storage devices. The primary object data store 402 can store information in data containers 404. In various examples, the data containers 404 can be referred to as buckets. The data container 404 can store information related to one or more data files 406. In one or more examples, the information stored by the data files 406 can be generated according to input obtained via one or more applications. Individual data files 406 can include a number of objects. For example, individual data files 406 can include a data object 408. The data object 408 can include information that is to be accessed and/or manipulated by at least one of one or more users or one or more applications. The individual data files 406 can also include a metadata object 410. The metadata object 410 can include information related to the data object 408. For example, the metadata object 410 can include an identifier of the data object 408. The identifier of the data object 408 can include at least one of a pointer, a uniform resource locator, or an Internet Protocol (IP) address that indicates a storage location of the data object 408 in the primary object data store 402 and can be used to access the data object 408. In one or more additional examples, the metadata object 410 can indicate a directory that can be used to access the data object 408. In still other examples, the metadata object 410 can indicate attributes of the data object 408. To illustrate, the metadata object 410 can indicate one or more owners of the data object 408, access permissions for the data object 408, timestamps indicating one or more events related to the data object 408, one or more combinations thereof, and the like.

In at least some examples, the individual data files 406 can include a locking object 412. The locking object 412 can be generated in response to a write request with respect to the data object 408. The locking object 412 can indicate that the current user that provided the write request is able to modify the data object 408 and that other users are unable to modify to the data object 408. In one or more illustrative examples, the locking object 412 can include an identifier of the user, an identifier of the file system, or both that have submitted the request to write to the data object 408. In various examples, the locking object 412 can be deleted or otherwise removed from the data file 406. For example, after one or more write operations are complete with respect to the data object 408, the locking object 412 can be removed from the data file 406. In one or more additional examples, the locking object 412 can expire after a period of time has elapsed. In one or more illustrative examples, the locking object 412 can have a duration that is a number of microseconds, a number of milliseconds, a number of seconds, a number of minutes, or a number of hours. In response to expiration of the locking object 412, the locking object 412 can be removed from the data file 406. After removal of the locking object 412, another locking object 412 can be generated in response to a write request in relation to the data object 408 from the same user that provided the write request that caused the locking object 412 to be generated or in response to a write request for the data object 408 by another user. In one or more further examples, the locking object 412 can be removed in response to streaming the data object 408 to one or more file systems. Although the illustrative example of FIG. 4 shows the primary object data store 402 as the only object data store included in the computational architecture 400, in one or more additional implementations, the computational architecture 400 can include multiple object data stores. In these scenarios, the primary object data store 402 can be a source of ground truth data for the computational architecture 400 and the one or more additional object data stores can operate as backup object data stores. In one or more further examples, the primary object data store 402 can be at least one of maintained, controlled, or administered by a first object data storage service provider and at least a portion of the one or more additional object data stores 402 can be at least one of maintained, controlled, or administered by one or more additional object data storage service providers. In still other implementations, the primary object data store 402 and the one or more additional object data stores can be at least one of maintained, controlled, or administered by the same object data storage service provider.

The primary object data store 402 can be coupled to an object data store management system 414. The object data store management system 414 can control and/or manage access to data files 406 stored by the primary object data store 402. In one or more examples, the object data store management system 414 can receive requests to read data objects 408 or requests to write with respect to the data objects 408. The object data store management system 414 can retrieve data objects 408 from data containers 404 and send a copy of the data objects 408 to computing devices that request access to the data objects 408. In situations where the object data store management system 414 receives a write request, the object data store management system 414 can generate a locking object 412 in relation to the data object 408 that is the subject of the write request.

The computational architecture 400 can also include a first site data store management system 416 that is in electronic communication with first site data storage 418. Information stored by the first site data storage 418 can be accessed using a first site file system 420. Additionally, the computational architecture 400 can include a second site data store management system 422 that is in electronic communication with second site data storage 424. Information stored by the second site data storage 424 can be accessed using a second site file system 426. In one or more examples, the first site data store management system 416, the first site data storage 418, and the first site file system 420 can correspond to a first location and the second site data store management system 422, the first site data storage 424, and the second site file system 426 can correspond to a second location. In one or more illustrative examples, the first location and the second location can be separated by a relatively large distance, such as tens of miles, hundreds of miles, up to thousands of miles. In one or more additional illustrative examples, the first location and the second location can be separated by a relatively short distance, such as less than a few miles. The first location and the second location can correspond to different sites of one or more entities that at least one of maintain, control, manage, or administer the first site data store management system 416, the first site data storage 418, the first site file system 420, the second site data store management system 422, the second site data storage 424, and the second site file system 426.

In various examples, the computational architecture 400 can also include a remote data store management system 428 that is in electronic communication with a remote data store 430. In one or more examples, the remote data store management system 428 can be at least one of controlled, maintained, administered, or managed by one or more cloud storage service providers. Information stored by the remote data store 430 can be accessed via a remote file system 432. Further, the computational architecture 400 can include computational operations systems 434. The computational operations systems 434 can provide processing resources that can be used to perform computational operations with respect to data objects 408 stored by the primary object data store 402. In at least some examples, processing resources provided by the computational operations systems 434 can be offered by one or more cloud computing providers. In one or more additional examples, the processing resources can be available on one or more servers of the one or more cloud computing providers.

Further, the computational architecture 400 can include one or more user devices 636. The one or more user devices 636 can include one or more computing devices, such as one or more laptop computing devices, one or more tablet computing devices, one or more desktop computing devices, one or more mobile computing devices, one or more combinations thereof, and the like. The one or more user devices 636 can access at least one of the first site file system 420 or the second site file system 426. The one or more user devices 636 can obtain input to access information stored by one or more data files 406 of the primary object data store 402. For example, the one or more user devices 636 can generate a read request or a write request that can be used to access one or more data objects 408.

In one or more illustrative examples, a user device 436 can correspond to a first site and have access to the first site file system 420. In these situations, the user device 436 can be used to identify an identifier of a file to be accessed via the user device 436. A request can then be sent to the first site file system 420 that includes the identifier of the file. In various examples, the identifier of the file can also correspond to a directory of the first site file system 420. Based on the identifier of the file, the first site file system 420 can identify metadata stored in the first site data storage 418. For example, the first site data storage 418 can store first metadata 438. The first metadata 438 corresponds to data files 406 stored by the primary object data store 402 that are accessible to the one or more user devices 636. In one or more additional illustrative examples, the first metadata 438 can indicate locations of the data files 406 within the primary object data store 402. In at least some examples, in response to receiving a file identifier in a request to access a data file 406, the first site file system 420 can determine a portion of the first metadata 438 that corresponds to the requested data file 406. The first site file system 420 can determine a location of the requested data file 406 based on the file identifier included in the access request and send a request to the object data store management system 414 to retrieve the data object 408 that corresponds to the requested data file 406. The object data store management system 414 can generate a locking object 412 for the data file 406 and send a copy of the data object 408 to the first set data store management system 416. The copy of the data object 408 can be stored in first temporary data object store 440. In one or more further illustrative examples, the first temporary data object store 440 can include cache memory.

The user device 436 requesting the data file 406 can capture input that can be used to modify the copy of the data object 408 stored by the first temporary data object store 440. In one or more examples, at least a portion of the information included in the copy of the data object 408 can be subjected to one or more computational operations. The one or more computational operations can include at least one of one or more word processing operations, one or more mathematical operations, one or more statistical operations, or one or more machine learning operations. In one or more examples, the one or more computational operations can be performed by the first site data store management system 416. In one or more additional examples, the one or more computational operations can be performed by the computational operations systems 434. In at least some examples, the computational operations systems 434 identified to perform the one or more computational operations can be determined based on at least one of a cost, capacity, or availability to perform the one or more computational operations. For example, the cost, availability, and/or capacity of a plurality of cloud computing service providers to perform the one or more computational operations can be analyzed to determine a specified cloud computing service provider to perform the one or more computational operations.

After a selected cloud computing service provider has performed the one or more computational operations, the modified data object can be sent to the first site data store management system 416. The modified data object can be stored by the first temporary data object store 440. In one or more examples, the first site file system 420 can send the modified data object to the object data store management system 414. The object data store management system 414 can cause the modified data object to be stored in the primary object data store 402. In at least some examples, the modified data object can be stored in the data container 404 of the original data object 408. In still other examples, the modified data object can be stored in the data file 406 of the original data object 408. In various examples, a locking object 412 corresponding to the original data object can be removed from the data file 406. Further, the metadata 410 corresponding to the original data object 408 can be modified. For example, a storage location of the modified data object can be updated. In situations where the metadata object 410 for the modified data object is updated, the object data store management system 414 can send the modifications to the metadata object 410 to the first site data store management system 416. In these scenarios, the first site file system 420 can modify the first metadata 438 to correspond to the updates to the metadata object 410.

In response to updates to the first metadata 438, the first site file system 420 can send the updates to the first metadata 438 to the second site file system 426. The second site file system 426 can then update second metadata 442 stored by the second site data storage 424. In this way, updates to metadata made in relation to different file systems at different sites are propagated to other sites. As a result, individual data objects stored by the primary object data store 402 can be accessed by both the first site file system 420 and the second site file system 426. In scenarios where a user device 436 sends requests to access data from the primary object data store 402 using the second site file system 426, the second site data storage 424 includes a second temporary data object store 444 to store data objects 408 and modified data objects accessed and/or generated via the second site file system 426. Additionally, data objects and/or modified data objects stored by the first temporary data object store 440 and the second temporary data object store 444 can be removed either after a specified period of time or in response to one or more commands generated by the one or more user devices 636, the first site file system 420, or the second site file system 426. Additionally, in situations where the remote data store 430 is backup storage for the primary object data store 402, modified data objects and modified metadata can also be stored by the remote data store 430 via the remote file system 432.

Figure 5:
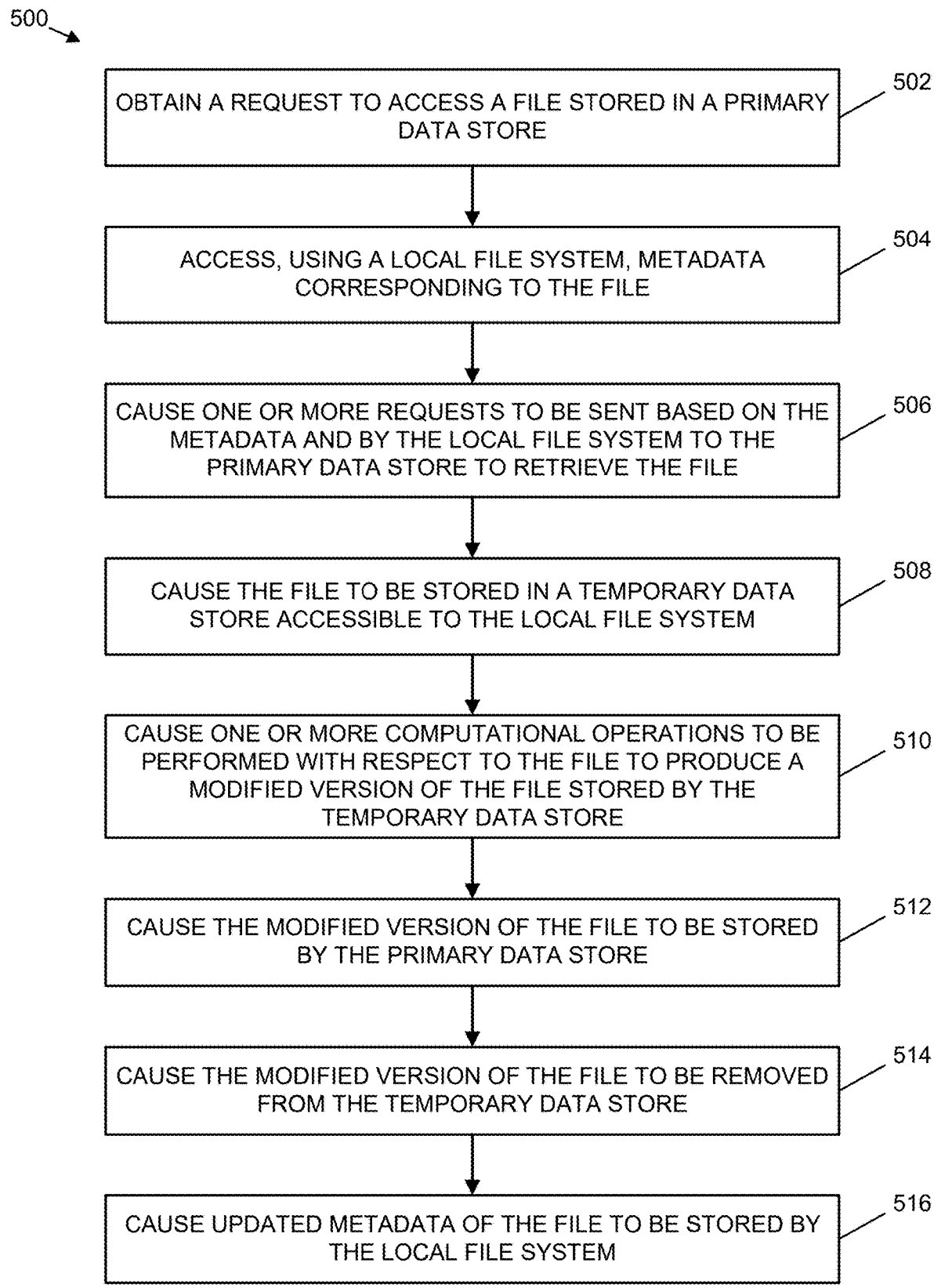
FIG. 5 illustrates an example flow diagram of a process to store, retrieve, and modify data in a high performance computing environment, according to some examples.

FIG. 5 illustrates an example flow diagram of a process 500 to store, retrieve, and modify data in a high performance computing environment, according to one or more example implementation. The process 500 can include, at 502, obtaining a request to access a file stored in a primary data store. In one or more examples, a computing device can display a user interface that corresponds to a local file system. For example, a user device at a location of an entity can access the local file system via one or more data control systems of the entity. In one or more illustrative examples, the one or more data control systems of the entity can include the data processing controller 202 described in relation to FIGS. 2 and 3. The user interface can include one or more user interface elements. The one or more user interface elements can correspond to one or more files that are accessible to the computing device by the local file system. The user interface elements can be selectable to cause at least one of one or more requests, one or more commands, or one or more application programming interface (API) calls to be provided to the local file system such that the computing device can access the one or more files. In one or more illustrative examples, at least one of the computing device or one or more data control systems of the entity corresponding to the computing device can provide the one or more requests, one or more commands, and/or one or more API calls to the local file system in response to selection of one or more user interface elements corresponding to one or more files. In at least some examples, a local file system can be an instance of file system instructions being executed by at least one of one or more servers of the entity or one or more third-party servers. In various examples, the one or more third-party servers can be at least one of administered, maintained, or controlled by an entity related to the file system.

In one or more examples, the files accessible to the computing device can be based on credentials of the user of the computing device. To illustrate, a first user can have first credentials indicating that the first user can access one or more first files that are accessible via the local file system and a second user can have second credentials indicating that the second user can access one or more second files that are accessible via the local file system. The credentials of a user can be based on a position of the user within the entity, one or more job duties of the user, one or more locations of the user, one or more combinations thereof, and the like. In various examples, access to files can be restricted based on the type of data included in the file. For example, personal information, health related information, clinical trials information, one or more combinations thereof, and so forth can be subject to restricted access.

At 504, the process 500 can include accessing, using a local file system, metadata corresponding to the file. The metadata can be stored in a data store that is accessible to at least one of the computing device or the local file system. In one or more examples, the metadata can be stored in memory that is located at a same location as the computing device. That is, the metadata can be stored in on-premises memory. The metadata can also be stored in memory that is at least one of maintained, controlled, or administered by the entity related to the computing device. In still other examples, the metadata can be stored in memory of the local file system. In one or more further examples, the metadata can be stored in one or more third-party data stores. In one or more illustrative examples, the metadata can indicate one or more storage locations of the data included in the file in the primary data store. In various examples, the one or more storage locations of the data can include one or more uniform resource locators. In one or more additional examples, the one or more storage locations of the data can include a path related to the file. In at least some examples, the metadata can indicate one or more types of data included in the file, one or more access restrictions to the file, one or more users related to the file, at least a portion of a version history of the file, one or more combinations thereof, and the like.

The process 500 can also include, at 506, causing one or more requests to be sent based on the metadata and by the local file system to the primary data store to retrieve the file. In one or more examples, the one or more requests can be sent by the local file system in response to at least one of one or more commands, one or more API calls, or other instructions provided to the local file system by at least one of the computing device or a computing system of the entity related to the computing device. In at least some examples, the requests can include at least one of an identifier of the file to be retrieved or a storage location of the file to be retrieved. In response to the one or more requests, the local file system can provide one or more communications to the primary data store to retrieve the file. In various examples, the local file system can be in communication with a data store management system coupled to the primary data store. The local file system can send at least one of one or more commands, one or more API calls, or one or more additional instructions to the data store management system to retrieve the file from the primary data store and send the file to the local file system. In one or more illustrative examples, the primary data store can include a data store that is remote with respect to at least one of the computing device or the local file system. For example, the primary data store can include memory that is included in a cloud computing architecture that is at least one of controlled, maintained, or administered by a third-party. In one or more additional illustrative examples, the primary data store can include an object data store.

Additionally, at 508, the process 500 can include causing the file to be stored in a temporary data store that is accessible to the local file system. In one or more examples, the file can be stored in cache memory of the local file system. In one or more additional examples, the file can be stored in cache memory of a computing system that is accessible to the local file system and at least one of maintained, controlled, or administered by the entity of the computing device. In various examples, the temporary data store can include on-premises memory with respect to the computing device requesting the file.

Further, the process 500 can include, at 510, causing one or more operations to be performed with respect to the file to produce a modified version of the file stored by the temporary data store. In one or more examples, the one or more operations can include modifications to data included in the file. The one or more operations can also include at least one of a computational analysis, a machine learning analysis, or statistical analysis of data included in the file. In one or more additional examples, the one or more operations can include one or more generative operations that generate additional content based on the information included in the file. The one or more operations can be performed by one or more instances of hardware and/or software executed by the computing device. Additionally, the one or more operations can be performed by one or more instances of hardware and/or software executed by one or more computing systems that are on-premises with respect to the computing device. Further, the one or more operations can be performed by one or more instances of at least one of hardware or software executed remotely with respect to the computing device. For example, the one or more operations can be performed by one or more computing systems of a cloud computing architecture that is configured to execute software and/or implement hardware to perform the one or more operations.

At 512, the process 500 can include causing the modified version of the file to be stored by the primary data store. In one or more examples, the storing of the modified version of the file by the primary data store can be performed in response to determining that modifications to the file are no longer being made. For example, at least one of the computing device, the local file system, or a data control system of the entity related to the computing system can determine that the modified version of the file has been closed. In various examples, at least one of the computing device, the local file system, or a data control system of the entity related to the computing device can determine that one or more commands and/or one or more requests to close the file or stop modifying data of the file have been generated by at least one of the computing device, the local file system, or a data control system of the entity related to the computing system.

In one or more illustrative examples, a session can be initiated in response to the file being requested by the computing device. The session can be initiated by at least one of the computing device or the local file system. Data generated during the session and/or data modified during the session can be stored as the modified version of the file. In various examples, the modified version of the file can correspond to one or more additional files. For example, an analysis can be performed with respect to data included in the file and additional data can be generated as part of the analysis. The additional data can be stored in one or more additional files. In these situations, the modified version of the file can be at least one of physically or logically associated with the one or more additional files. To illustrate, metadata of the modified version of the file can indicate the association between the modified version of the file and the one or more additional files. In various examples, the modified version of the file and the one or more additional files can be stored in relation to one another. In still other examples, a modified version of the file can correspond to modifications of at least one of data included in the file or metadata related to the file.

In at least some examples, differences between the file and the modified version of the can be stored in the primary data store. For example, a previous version of the file can be updated with the differences between the previous version of the file and a current modified version of the file to produce the modified version of the file in the primary data store. At least one of the local file system or a data control system of the entity related to the computing device can track changes made to the previous version of the file in order to produce the modified version of the file. In this way, changes made to a previous version of the file are provided to the primary data store and the remaining data of the file can be dehydrated. That is, in one or more illustrative examples, the local file system and/or data control system can cause changes to the initial version of the file to be electronically communicated to the primary data store while the remainder of the data related to the file can be deleted because the remainder of the data related to the file is already stored in the storage location of the initial version of the file.

In at least some examples, the modified version of the file can be stored in a same storage location of the primary data store as the previous version of the file. For example, the modified version of the file can be stored in an object of the primary data store that corresponds to the original file. In various examples, at least one of the computing device, a data control system, or the local file system can generate one or more commands and/or API calls to cause the modified version of the file to be stored in the same object of the primary data store as the previous version of the file. In this way, an object can be created in the primary data store when an initial version of a file is created and subsequent versions of the file can also be stored in the same object. As a result, the object stored in the primary data store for the file can serve as a source of ground truth for the file and enable multiple file systems to access the file using a common storage identifier.

The process 500 can include, at 514, causing the modified version of the file to be removed from the temporary data store. In one or more examples, the modified version of the file can be deleted from the temporary data store after the modified version of the file is stored by the primary data store. In various examples, the modified version of the file can be deleted from the temporary data store after receiving an indication from a database management system of the primary data store that the modified version of the file has been stored in a location of the primary data store. In at least some examples, at least one of the local file system, the computing device, or a data control system of the entity related to the computing device can provide one or more commands and/or API calls to cause the modified version of the file to be removed from the temporary data store. In one or more illustrative examples, causing the modified version of the file to be removed from the temporary data store can be part of a process to dehydrate data related to the file in the temporary data store the updated metadata of the file stored by the local file system. As part of the dehydration process, a stub file can be produced that indicates at least one of an identifier of the file or a storage location of the file in the primary data store.

In addition, the process 500 can include, at 516, causing updated metadata of the file to be stored by the local file system. In one or more examples, the updated metadata can include a storage location of the modified version of the file. In various examples, the metadata can include a stub file. The stub file can indicate the storage location of the modified version of the file such that the local file system can retrieve the modified version of the file from the primary data store to provide access to the modified version of the file by one or more computing devices.

In at least some examples, the updated metadata can be provided to one or more additional file systems. In one or more examples, the local file system can be one of a number of local file systems of an entity. In various examples, individual local file systems can correspond to one or more premises of the entity. In one or more illustrative examples, individual local file systems can correspond to an individual premises of the entity. In this way, an individual local file system can provide access to files for one or more computing devices located on an individual premises of the entity. Additionally, the individual local file systems can be coupled to or have access to local data storage and/or computational resources, such as one or more server computers, of the individual premises of the entity.

In situations where a local file system of the number of local file systems determines that changes have been made to metadata of a file accessed by the local file system, the local file system can cause the updated metadata to be provided to other local file systems of the entity. As a result, computing devices corresponding to the other local file systems can access updated versions of files that were generated by the local file system. To illustrate, a local file system related to an entity and used to access an initial version of a file and then store a modified version of the file can communicate to other local file systems of the entity that changes to the initial version of the file have been made and provide information to the other local file systems to enable computing devices corresponding to the other local file systems to access the modified version of the file. In this way, a single identifier of the storage location, such as an object of a primary data store, of the modified version of the file can be provided across multiple local file systems to enable computing devices at a number of premises and serviced by a number of local file systems to access the modified version of the file and to control access to the file such that changes to the file are not made by multiple users at the same time. In one or more illustrative examples, an object of the primary data store that stores the file can be a source of truth for data related to a number of versions of the file. Thus, an object of the primary data store created in response to an initial version of the file being created can serve as a source of truth for subsequent versions of the file that are generated.

In various examples, one or more of the local file systems can be dedicated to accessing data with one or more access restrictions. For example, one or more of the local file systems can be dedicated to accessing at least one of personal data, personal health information, medical data, genomics data, electronic medical records, insurance information, clinical trials information, financial information, and the like. Additionally, the data having one or more access restrictions can be stored in one or more primary data stores that comply with one or more regulations related to the storage of personal data, personal health information, medical data, genomics data, electronic medical records, insurance information, clinical trials information, financial information, one or more combinations thereof, and so forth. In this way, access to and storage of data having one or more access restrictions can be controlled by one or more local file systems that are dedicated to accessing and storing data having one or more access restrictions.

Although the process 500 has been described in relation to generating and storing a modified version of an existing file, at least a portion of the operations of the process 500 can also be implemented to create and store a newly created file. For example, a user of the computing device can execute an application to create content. The content can include at least one of text content, image content, video content, or audio content. The content can be created in relation to a file. In one or more examples, as the content for the file is being created or after an initial version of the file content is produced, the file can be stored in a temporary data store accessible to the local file system. The local file system can be used to determine an identifier for the file. In various examples, the identifier of the file can be based at least partly on input provided by the user of the computing device.

Additionally, the local file system can communicate with the primary data store to create a new object of the primary data store in which to store the file. To illustrate, the local file system can communicate at least one of one or more commands or API calls of the primary data store to cause the primary data store to create a new object for the file. The local file system can also communicate at least one of one or more commands or API calls of the primary data store to cause the data included in the file to be stored in the object corresponding to the file in the primary data store. Additionally, the local file system can provide metadata for the newly created file to other file systems. In this way, computing devices accessing additional file systems can access the file by communicating with the primary data store according to the metadata of the file. After the initial version of the file is stored in an object of the primary data store, the process 500 can be implemented to make changes to the file.

In one or more illustrative examples, the data to be accessed from the primary data store can include genetics data. In various examples, the genetics data can be generated in relation to one or more diagnostic tests to identify the presence or absence of a biological condition within subjects. In at least some examples, a number of computational operations can be performed with respect to the genetics data. The computational operations can include an analysis of the genetics data. In one or more examples, the analysis of the genetics data can modify the genetics data. In various examples, the modified genetics data can include additional data that is derived from the genetics data. The computational operations can be performed locally by processing resources related to the file system. The computational operations can also be performed by one or more cloud computing providers. In response to the completion of the computational operations and in response to one or more users no longer accessing the genetics data and/or the modified genetics data, the genetics data and/or modified genetics data can be removed from temporary storage at the site and be stored within the primary object data store. Updates to the metadata corresponding to the genetics data and/or modified genetics data can be propagated to each file system within an organization such that users at different locations of an organization can access the genetics data and/or modified genetics data in a unified manner.

EXAMPLES

Example 1. A method comprising: storing, by a data processing controller on a centralized server, a plurality of files in a standardized format; receiving, from a first computing system by the data processing controller, a first request to access a first file of the plurality of files, the first computing system generating the request using a first type of file system; receiving, from a second computing system by the data processing controller, a second request to access a second file of the plurality of files, the second computing system generating the request using a second type of file system different from the first type of file system of the first computing system; and controlling, by the data processing controller, access to the first and second files in response to receiving the first and second requests.

Example 2. The method of Example 1, further comprising: converting, by the first computing system, the first file from the standardized format to a format compatible with the first type of file system.

Example 3. The method of Example 2, further comprising: storing the first file on a cache of the first computing system; and tracking changes to the first file in the cache of the first computing system.

Example 4. The method of Example 3, further comprising: updating a data object stored on the centralized server associated with the first file based on the changes to the first file in the cache of the first computing system, the first file stored on the centralized server representing a source of truth version of the first file.

Example 5. The method of Example 4, wherein the data object is updated periodically to reflect the changes to the first file.

Example 6. The method of any one of Examples 4-5, further comprising: merging changes to the first file stored in the data object with source of truth version of the first file.

Example 7. The method of any one of Examples 4-6, further comprising: communicating the changes to the first file stored in the data object to the second computing system in response to determining that the second computing system is currently accessing the first file.

Example 8. The method of any one of Examples 1-7, further comprising: storing one or more data objects in association with each file of the plurality of files, the one or more data objects representing a storage location of each file on the centralized server, a lock status of each file, and changes made to each file by cached copies of each file on respective computing systems.

Example 9. The method of Example 8, further comprising: in response to receiving the first request, using the one or more data objects associated with the first file to determine whether the first file is currently in use by another computing system.

Example 10. The method of any one of Examples 1-9, wherein the first computing system comprises a server associated with a cloud services provider different from a cloud services provider corresponding to the centralized server.

Example 11. The method of any one of Examples 1-10, wherein the first computing system is associated with and managed by a life science service provider.

Example 12. The method of Example 11, wherein the second computing system is associated with and managed by one or more third-parties relative to the life science service provider.

Example 13. The method of any one of Examples 1-12, wherein the first file comprises patient data including genomic information of a number of subjects.

Example 14. The method of any one of Examples 1-13, further comprising: performing, by a bioinformatics system implemented by the first type of file system, an analysis of at least a portion of a batch of data in the first file; and determining, based on performing the analysis, one or more characteristics of subjects that correspond to the at least the portion of the batch of data.

Example 15. The method of Example 14, wherein: the one or more characteristics include one or more genomic mutations present in nucleic acids derived from samples obtained from one or more subjects; and the nucleic acids correspond to cell-free deoxyribonucleic acid (DNA) extracted from bodily fluid samples obtained from the one or more subjects.

Example 16. The method of any one of Examples 14-15, wherein the one or more characteristics include developing resistance to a treatment provided to one or more subjects in conjunction with a biological condition present in the one or more subjects.

Example 17. The method of Example 16, wherein the biological condition corresponds to a form of cancer.

Example 18. The method of any one of Examples 14-16, wherein the analysis includes determining a recommendation for a treatment to provide to one or more subjects to treat a biological condition present in the one or more subjects.

Example 19. A system comprising: one or more hardware processing units; and one or more computer-readable storage media storing computer-executable instructions that, when executed by the one or more hardware processing units, cause the system to perform operations comprising: storing, by a data processing controller on a centralized server, a plurality of files in a standardized format; receiving, from a first computing system by the data processing controller, a first request to access a first file of the plurality of files, the first computing system generating the request using a first type of file system; receiving, from a second computing system by the data processing controller, a second request to access a second file of the plurality of files, the second computing system generating the request using a second type of file system different from the first type of file system of the first computing system; and controlling, by the data processing controller, access to the first and second files in response to receiving the first and second requests.

Example 20. One or more non-transitory computer-readable storage media storing computer-executable instructions that, when executed by one or more hardware processing units, cause a system to perform operations comprising: storing, by a data processing controller on a centralized server, a plurality of files in a standardized format; receiving, from a first computing system by the data processing controller, a first request to access a first file of the plurality of files, the first computing system generating the request using a first type of file system; receiving, from a second computing system by the data processing controller, a second request to access a second file of the plurality of files, the second computing system generating the request using a second type of file system different from the first type of file system of the first computing system; and controlling, by the data processing controller, access to the first and second files in response to receiving the first and second requests.

Example 21 is a method comprising: obtaining, from a computing system including memory and one or more processors, a request to access a file stored in a primary data store, wherein the computing system is at least one of maintained, controlled, or administered by a first entity and the primary data store is at least one of maintained, controlled, or administered by a second entity that includes a cloud storage service provider; accessing, by the computing system and using a local file system, metadata corresponding to the file, wherein the metadata indicates an object of the primary data store that includes data corresponding to the file; causing, by the computing system, one or more requests to be sent based on the metadata and by the local file system to the primary data store to retrieve the file; causing, by the computing system, the file to be stored in a temporary data store of the first entity and that is accessible to the local file system; causing, by the computing system, one or more computational operations to be performed with respect to the file to produce a modified version of the file that is stored in the temporary data store; causing, by the computing system, the modified version of the file to be stored in the object of the primary data store via the local file system; causing, by the computing system, the modified version of the file to be removed from the temporary data store; and causing, by the computing system, updated metadata of the modified version of the file to be stored in additional memory of the first entity that is accessible to the local file system.

In Example 22, the subject matter of Example 21 optionally includes wherein: the computing system receives the request to access the file from a computing device of a user, wherein the computing device corresponds to the first entity and has access to the local file system; and the computing system includes a data processing controller executing on one or more servers of the first entity.

In Example 23, the subject matter of Example 22 optionally includes wherein the local file system and the computing device are associated with a premises of the first entity, the premises of the first entity including at least one server computer that executes an instance of the local file system and including the temporary data store that is accessible to the local file system.

In Example 24, the subject matter of any one or more of Examples 22-23 optionally include wherein: in response to receiving the request to access the file, the computing system determines at least one of the one or more commands or the one or more application programming interface calls of the local file system to cause the local file system to retrieve the metadata from additional memory of the first entity and retrieve the file from the primary data store based on the metadata; and sending, by the computing system, the at least one of one or more commands or one or more application programming interface calls to the local file system.

In Example 25, the subject matter of Example 24 optionally includes wherein the computing device displays one or more user interfaces including a plurality of user interface elements, the plurality of user interface elements including a user interface element corresponding to the file and that is selectable to cause the at least one of the one or more commands or the one or more application programming interface calls to be sent to the instance of the local file system being executed by the at least one server computer.

In Example 26, the subject matter of any one or more of Examples 22-25 optionally include wherein the modified version of the file is stored by the primary data store in response to determining that modifications are no longer being made to data corresponding to the file.

In Example 27, the subject matter of Example 26 optionally includes initiating a session of an instance of an application in response to one or more additional requests obtained from the computing device; wherein modifications are made to the file according to the one or more operations based on input provided during the session to produce the modified version of the file; and wherein the one or more operations correspond to at least one of modifying existing data of the file or adding additional data to the file.

In Example 28, the subject matter of Example 27 optionally includes wherein the instance of the application is executed by at least one of the computing device, the one or more servers, or one or more cloud computing computational services.

In Example 29, the subject matter of any one or more of Examples 26-28 optionally include wherein determining that modifications are no longer being made to data corresponding to the file includes determining that the session of the instance of the application has been terminated.

In Example 30, the subject matter of any one or more of Examples 21-29 optionally include wherein causing the modified version of the file to be removed from the temporary data store is part of a process to dehydrate data related to the file in the temporary data that includes storing the updated metadata of the file stored by the local file system and includes producing a stub file during the dehydration process, wherein the stub file indicates at least one of an identifier of the file or a storage location of the file in the primary data store.

In Example 31, the subject matter of any one or more of Examples 21-30 optionally include wherein: data stored by the file includes scientific data including at least one of genomic information, genetic information, metabolomic information, transcriptomic information, fragmentiomic information, immune receptor information, methylation information, epigenomic information, or proteomic information; and at least a portion of the one or more computational operations to produce the modified version of the file are performed by an bioinformatics pipeline of the first entity.

Example 32 is a computing system comprising: one or more hardware processors; and memory storing computer-readable instructions that, when executed by the one or more hardware processors, cause the one or more hardware processors to perform operations comprising: obtaining a request to access a file stored in a primary data store, wherein the computing system is at least one of maintained, controlled, or administered by a first entity and the primary data store is at least one of maintained, controlled, or administered by a second entity that includes a cloud storage service provider; accessing, using a local file system, metadata corresponding to the file, wherein the metadata indicates an object of the primary data store that includes data corresponding to the file; causing one or more requests to be sent based on the metadata and by the local file system to the primary data store to retrieve the file; causing the file to be stored in a temporary data store of the first entity and that is accessible to the local file system; causing one or more computational operations to be performed with respect to the file to produce a modified version of the file that is stored in the temporary data store; causing the modified version of the file to be stored in the object of the primary data store via the local file system; causing the modified version of the file to be removed from the temporary data store; and causing updated metadata of the modified version of the file to be stored in additional memory of the first entity that is accessible to the local file system.

In Example 33, the subject matter of Example 32 optionally includes wherein: the request to access the file is received from a computing device of a user, wherein the computing device corresponds to the first entity and has access to the local file system; the computing system includes a data processing controller executing on one or more servers of the first entity; the local file system and the computing device are associated with a premises of the first entity, the premises of the first entity including at least one server computer that executes an instance of the local file system and including the temporary data store that is accessible to the local file system.

In Example 34, the subject matter of Example 33 optionally includes wherein the premises is one of a plurality of premises of the first entity, individual premises of the plurality of premises corresponding to a respective local file system, including at least one respective server computer that executes the respective local file system, and including a respective temporary data store that is accessible to the respective local file system.

In Example 35, the subject matter of Example 34 optionally includes wherein the memory stores additional computer-readable instructions that, when executed by the one or more hardware processors, cause the one or more hardware processors to perform additional operations comprising: causing the updated metadata of the file to be stored in additional memory of an additional premises of the plurality of premises; obtaining an additional request to access the modified version of the file from a computing device of the additional premises; and causing one or more additional requests to be sent based on the updated metadata and by an additional file system of the additional premises to the primary data store to retrieve the modified version of the file.

In Example 36, the subject matter of Example 35 optionally includes wherein the modified version of the file is stored in a same object as an initial version of the file and the updated metadata includes a storage location of the primary data store corresponding to the object.

In Example 37, the subject matter of any one or more of Examples 35-36 optionally include wherein the memory stores additional computer-readable instructions that, when executed by the one or more hardware processors, cause the one or more hardware processors to perform additional operations comprising: causing the modified version of the file to be stored in an additional temporary data store of the additional premises that is accessible to the additional file system; causing an additional modified version of the file to be stored by the additional local file system in the same object of the initial version of the file in the primary data store; and causing additional updated metadata of the file to be stored in respective storage devices of the plurality of premises.

In Example 38, the subject matter of Example 37 optionally includes 18 wherein the memory stores additional computer-readable instructions that, when executed by the one or more hardware processors, cause the one or more hardware processors to perform additional operations comprising: causing the additional modified version of the file to be removed from the additional temporary data store; and producing the additional updated metadata of the additional modified version of the file in conjunction with causing the additional modified version of the file to be removed from the additional temporary data store.

Example 39 is one or more computer-readable storage media storing computer-readable instructions that, when executed by one or more hardware processors, cause the one or more hardware processors to perform operations comprising: obtaining a request to access a file stored in a primary data store, wherein the computing system is at least one of maintained, controlled, or administered by a first entity and the primary data store is at least one of maintained, controlled, or administered by a second entity that includes a cloud storage service provider; accessing, using a local file system, metadata corresponding to the file, wherein the metadata indicates an object of the primary data store that includes data corresponding to the file; causing one or more requests to be sent based on the metadata and by the local file system to the primary data store to retrieve the file; causing the file to be stored in a temporary data store of the first entity and that is accessible to the local file system; causing one or more computational operations to be performed with respect to the file to produce a modified version of the file that is stored in the temporary data store; causing the modified version of the file to be stored in the object of the primary data store via the local file system; causing the modified version of the file to be removed from the temporary data store; and causing updated metadata of the modified version of the file to be stored in additional memory of the first entity that is accessible to the local file system.

In Example 40, the subject matter of Example 39 optionally includes wherein the file and the modified version of the file are stored in an object of the primary data store, the object having a storage location identifier by which multiple file systems can access data of one or more versions of the file stored in the object and the object being a source of truth for the data of the one or more versions of the file.

Figure 6:
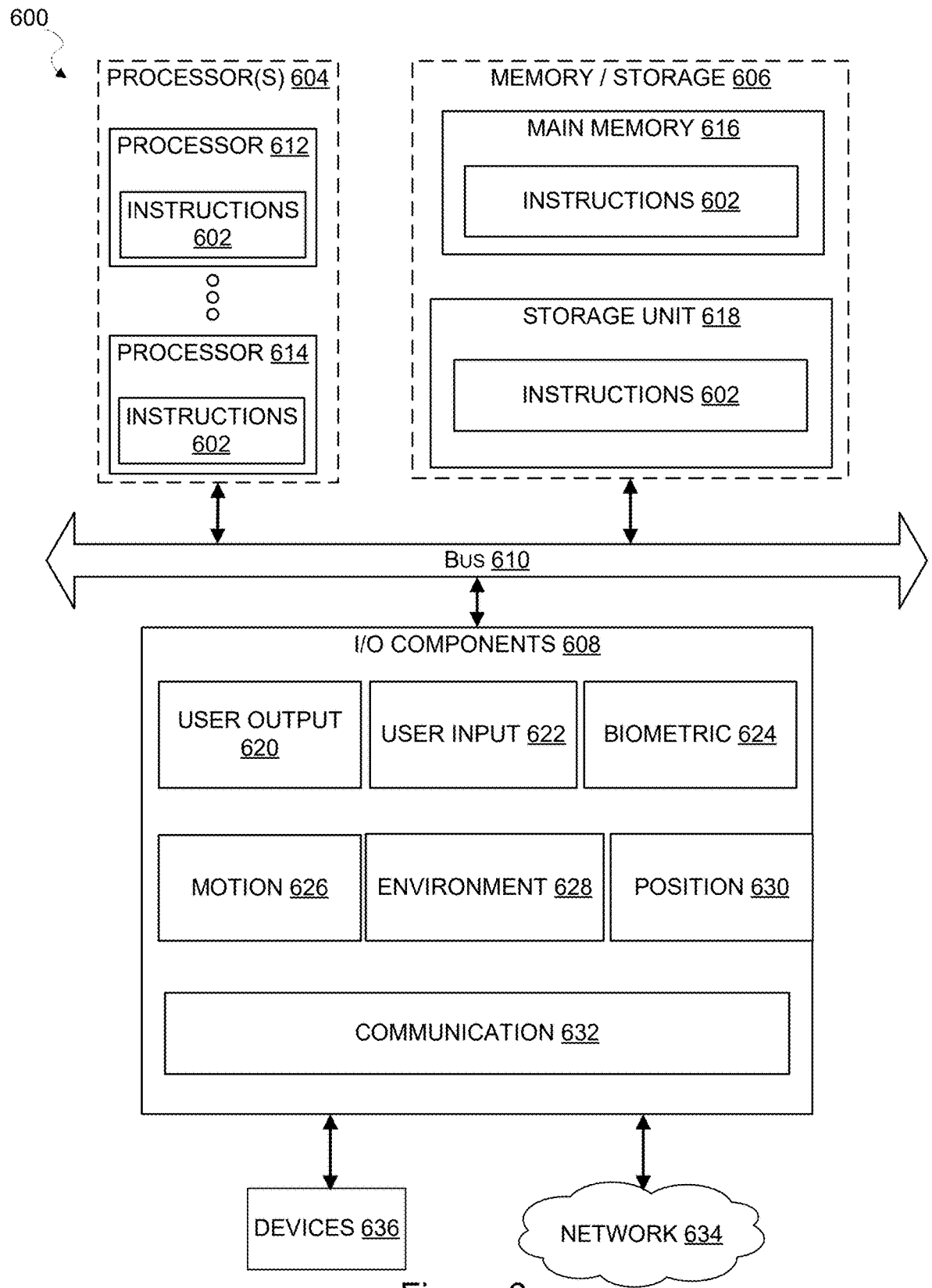
FIG. 6 is a block diagram illustrating components of a machine, in the form of a computer system, that may read and execute instructions from one or more machine-readable media to perform any one or more methodologies described herein, in accordance with some examples.

FIG. 6 is a block diagram illustrating components of a machine 600, in the form of a computer system, that may read and execute instructions from one or more machine-readable media to perform any one or more methodologies described herein, in accordance with one or more example implementations. Specifically, FIG. 6 shows a diagrammatic representation of the machine 600 in the example form of a computer system, within which instructions 602 (e.g., software, a program, an application, an applet, an app, or other executable code) for causing the machine 600 to perform any one or more of the methodologies discussed herein. As such, the instructions 602 may be used to implement modules or components described herein. The instructions 602 transform the general, non-programmed machine 600 into a particular machine 600 programmed to carry out the described and illustrated functions in the manner described. In alternative implementations, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 602, sequentially or otherwise, that specify actions to be taken by machine 600. Further, while only a single machine 600 is illustrated, the term "machine" shall also be taken to include a collection of machines that individually or jointly execute the instructions 602 to perform any one or more of the methodologies discussed herein.

The machine 600 may include processors 604, memory/storage 606, and I/O components 608, which may be configured to communicate with each other such as via a bus 610. In an example implementation, the processors 604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 602. The term "processor" is intended to include multi-core processors 604 that may comprise two or more independent processors (sometimes referred to as "cores") that may execute instructions 602 contemporaneously. Although FIG. 6 shows multiple processors 604, the machine 600 may include a single processor 612 with a single core, a single processor 612 with multiple cores (e.g., a multi-core processor), multiple processors 612, 614 with a single core, multiple processors 612, 614 with multiple cores, or any combination thereof.

The memory/storage 606 may include memory, such as a main memory 616, or other memory storage, and a storage unit 618, both accessible to the processors 604 such as via the bus 610. The storage unit 618 and main memory 616 store the instructions 602 embodying any one or more of the methodologies or functions described herein. The instructions 602 may also reside, completely or partially, within the main memory 616, within the storage unit 618, within at least one of the processors 604 (e.g., within the processor's cache memory), or any suitable combination thereof, during execution thereof by the machine 600. Accordingly, the main memory 616, the storage unit 618, and the memory of processors 604 are examples of machine-readable media.

The I/O components 608 may include a wide variety of components to receive input, provide output, produce output, transmit information, exchange information, capture measurements, and so on. The specific I/O components 608 that are included in a particular machine 600 will depend on the type of machine. For example, portable machines such as mobile phones will likely include a touch input device or other such input mechanisms, while a headless server machine will likely not include such a touch input device. It will be appreciated that the components 608 may include many other components that are not shown in FIG. 6. The I/O components 608 are grouped according to functionality merely for simplifying the following discussion and the grouping is in no way limiting. In various example implementations, the I/O components 608 may include user output components 620 and user input components 622. The user output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 622 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 608 may include biometric components 624, motion components 626, environmental components 628, or position components 630 among a wide array of other components. For example, the biometric components 624 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 626 may include acceleration sensor components (e.g., accelerometer), gravitation sensor components, rotation sensor components (e.g., gyroscope), and so forth. The environmental components 628 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 630 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 may include communication components 632 operable to couple the machine 600 to a network 634 or devices 636. For example, the communication components 632 may include a network interface component or other suitable device to interface with the network 634. In further examples, communication components 632 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 636 may be another machine 600 or any of a wide variety of peripheral devices (e.g., a peripheral device coupled via a USB).

Moreover, the communication components 632 may detect identifiers or include components operable to detect identifiers. For example, the communication components 632 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 632, such as location via Internet Protocol (IP) geo-location, location via Wi-Fi® signal triangulation, location via detecting an NFC beacon signal that may indicate a particular location, and so forth.

As used herein, "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 604 or another programmable processor. Once configured by such software, hardware components become specific machines (or specific components of a machine 600) uniquely tailored to perform the configured functions and are no longer general-purpose processors 604. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 604 configured by software to become a special-purpose processor, the general-purpose processor 604 may be configured as respectively different special-purpose processors (e.g., comprising different hardware components) at different times. Software accordingly configures a particular processor 612, 414 or processors 604, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 604 that are temporarily configured (e.g., by software) or permanently configured to perform the relevant operations. Whether temporarily or permanently configured, such processors 604 may constitute processor-implemented components that operate to perform one or more operations or functions described herein. As used herein, "processor-implemented component" refers to a hardware component implemented using one or more processors 604. Similarly, the methods described herein may be at least partially processor-implemented, with a particular processor 612, 414 or processors 604 being an example of hardware. For example, at least some of the operations of a method may be performed by one or more processors 604 or processor-implemented components. Moreover, the one or more processors 604 may also operate to support performance of the relevant operations in a "cloud computing" environment or as a "software as a service" (SaaS). For example, at least some of the operations may be performed by a group of computers (as examples of machines 400 including processors 604), with these operations being accessible via a network 634 (e.g., the Internet) and via one or more appropriate interfaces (e.g., an API). The performance of certain of the operations may be distributed among the processors, not only residing within a single machine 600, but deployed across a number of machines. In some example implementations, the processors 604 or processor-implemented components may be located in a single geographic location (e.g., within a home environment, an office environment, or a server farm). In other example implementations, the processors 604 or processor-implemented components may be distributed across a number of geographic locations.

Figure 7:
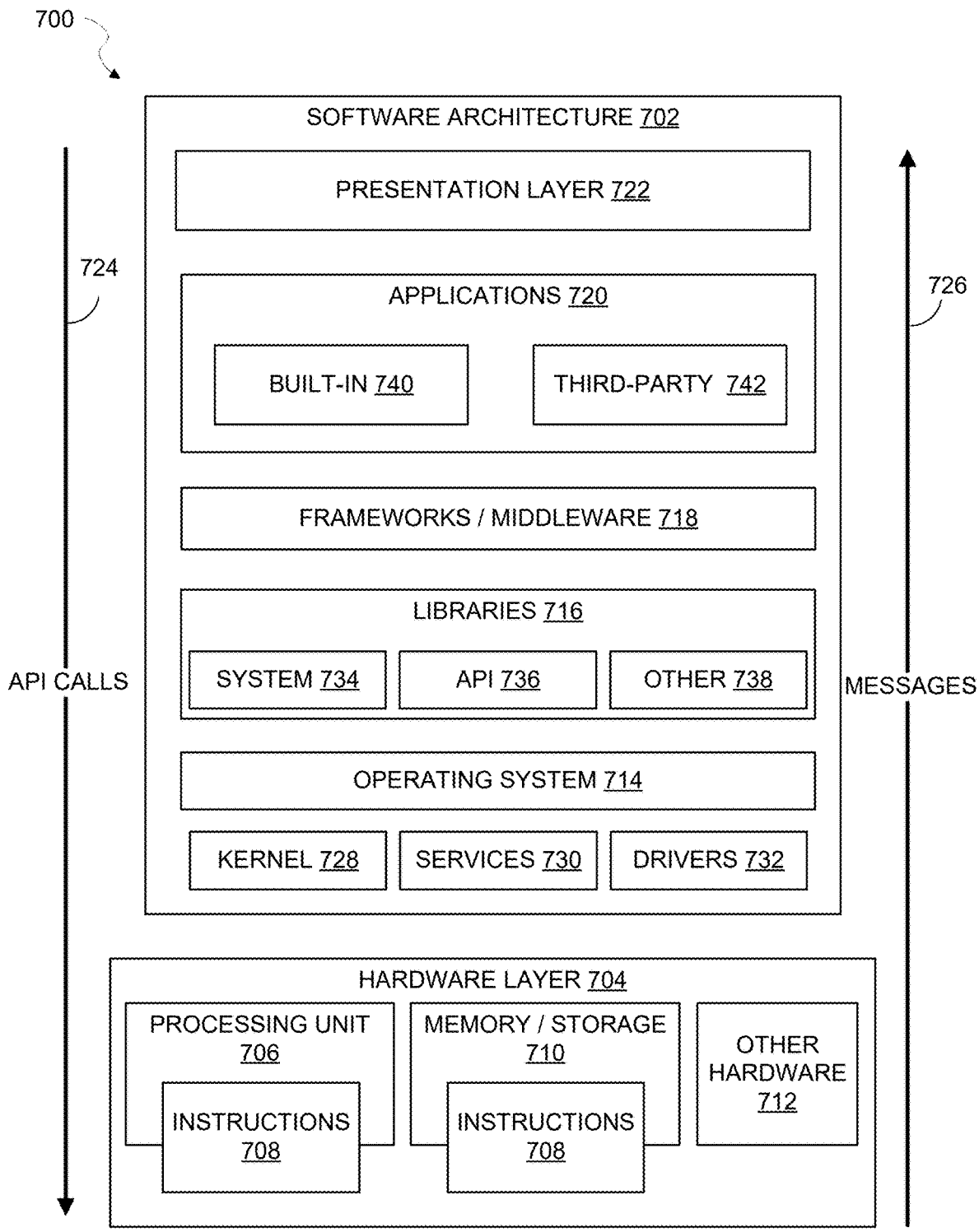
FIG. 7 is a block diagram illustrating a representative software architecture that may be used in conjunction with one or more hardware architectures described herein, in accordance with some examples.

FIG. 7 is a block diagram illustrating system 700 that includes an example software architecture 702, which may be used in conjunction with various hardware architectures herein described. FIG. 7 is a non-limiting example of a software architecture, and it will be appreciated that many other architectures may be implemented to facilitate the functionality described herein. The software architecture 702 may execute on hardware such as machine 600 of FIG. 6 that includes, among other things, processors 604, memory/storage 606, and input/output (I/O) components 608. A representative hardware layer 704 is illustrated and can represent, for example, the machine 600 of FIG. 6. The representative hardware layer 704 includes a processing unit 706 having associated executable instructions 708. Executable instructions 708 represent the executable instructions of the software architecture 702, including implementation of the methods, components, and so forth described herein. The hardware layer 704 also includes at least one of memory or storage modules memory/storage 710, which also have executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 722. Operationally, the applications 720 or other components within the layers may invoke API calls 724 through the software stack and receive messages 726 in response to the API calls 724. The layers illustrated are representative in nature and not all software architectures have all layers. For example, some mobile or special purpose operating systems may not provide a frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 are responsible for controlling or interfacing with the underlying hardware. For instance, the drivers 732 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 provide a common infrastructure that is used by at least one of the applications 720, other components, or layers. The libraries 716 provide functionality that allows other software components to perform tasks in an easier fashion than to interface directly with the underlying operating system 714 functionality (e.g., kernel 728, services 730, drivers 732). The libraries 716 may include system libraries 734 (e.g., C standard library) that may provide functions such as memory allocation functions, string manipulation functions, mathematical functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 (also sometimes referred to as middleware) provide a higher-level common infrastructure that may be used by the applications 720 or other software components/modules. For example, the frameworks/middleware 718 may provide various graphical user interface functions, high-level resource management, high-level location services, and so forth. The frameworks/middleware 718 may provide a broad spectrum of other APIs that may be utilized by the applications 720 or other software components/modules, some of which may be specific to a particular operating system 714 or platform.

The applications 720 include built-in applications 740 and third-party applications 742. Examples of representative built-in applications 740 may include, but are not limited to, a contacts application, a browser application, a book reader application, a location application, a media application, a messaging application, or a game application. Third-party applications 742 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 742 may invoke the API calls 724 provided by the mobile operating system (such as operating system 714) to facilitate functionality described herein.

The applications 720 may use built-in operating system functions (e.g., kernel 728, services 730, drivers 732), libraries 716, and frameworks/middleware 718 to create UIs to interact with users of the system. Alternatively, or additionally, in some systems, interactions with a user may occur through a presentation layer, such as presentation layer 722. In these systems, the application/component "logic" can be separated from the aspects of the application/component that interact with a user.

At least some of the processes described herein can be embodied in computer-readable instructions for execution by one or more processors such that the operations of the processes may be performed in part or in whole by the functional components of one or more computer systems. Accordingly, computer-implemented processes described herein are by way of example with reference thereto, in some situations. However, in other implementations, at least some of the operations of the computer-implemented processes described herein can be deployed on various other hardware configurations. The computer-implemented processes described herein are therefore not intended to be limited to the systems and configurations described with respect to FIGS. 6 and 7 and can be implemented in whole, or in part, by one or more additional system and/or components.

Although the flowcharts described herein can show operations as a sequential process, many of the operations can be performed in parallel or concurrently. In addition, the order of the operations can be re-arranged. A process is terminated when its operations are completed. A process can correspond to a method, a procedure, an algorithm, etc. The operations of methods may be performed in whole or in part, can be performed in conjunction with some or all of the operations in other methods, and can be performed by any number of different systems, such as the systems described herein, or any portion thereof, such as a processor included in any of the systems.

As used herein, a component can refer to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described implementations, as long as the teaching remains operable.

The various steps of the methods disclosed herein, or the steps carried out by the systems disclosed herein, may be carried out at the same time or different times, and/or in the same geographical location or different geographical locations, e.g., countries. The various steps of the methods disclosed herein can be performed by the same person or different people.

Various implementations of systems, devices, and methods have been described herein. These implementations are given only by way of example and are not intended to limit the scope of the claimed inventions. It should be appreciated, moreover, that the various features of the implementations that have been described may be combined in various ways to produce numerous additional implementations. Moreover, while various materials, dimensions, shapes, configurations, and locations, etc. have been described for use with disclosed implementations, others besides those disclosed may be utilized without exceeding the scope of the claimed inventions.

Persons of ordinary skill in the relevant arts will recognize that implementations may comprise fewer features than illustrated in any individual implementation described above. The implementations described herein are not meant to be an exhaustive presentation of the ways in which the various features may be combined. Accordingly, the implementations are not mutually exclusive combinations of features; rather, implementations can comprise a combination of different individual features selected from different individual implementations, as understood by persons of ordinary skill in the art. Moreover, elements described with respect to one implementation can be implemented in other implementations even when not described in such implementations unless otherwise noted. Although a dependent claim may refer in the claims to a specific combination with one or more other claims, other implementations can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one implementation," "an implementation," or "some implementations" means that a particular feature, structure, or characteristic, described in connection with the implementation, is included in at least one implementation of the teaching. The appearances of the phrase "in one implementation" in various places in the specification are not necessarily all referring to the same implementation.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Although an implementation has been described with reference to specific example implementations, it will be evident that various modifications and changes may be made to these implementations without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be utilized and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Although specific implementations have been illustrated and described herein, it should be appreciated that any arrangement calculated to achieve the same purpose may be substituted for the specific implementations shown. This disclosure is intended to cover any and all adaptations of various implementations. Combinations of the above implementations, and other implementations not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A method comprising:
    obtaining, from a computing system including memory and one or more processors, a request to access data corresponding to a file, wherein the data corresponding to the file is stored in a primary data store and the computing system is at least one of maintained, controlled, or administered by a first entity and the primary data store is at least one of maintained, controlled, or administered by a second entity that includes a cloud storage service provider;
    accessing, by the computing system and using a local file system, metadata corresponding to the data corresponding to the file, wherein the metadata indicates an object of the primary data store that includes the data corresponding to the file;
    causing, by the computing system, one or more requests to be sent based on the metadata and by the local file system to the primary data store to retrieve the data corresponding to the file;
    causing, by the computing system, the data corresponding to the file to be stored in a temporary data store of the first entity and that is accessible to the local file system;
    causing, by the computing system, one or more computational operations to be performed with respect to the data corresponding to the file to produce a modified version of the data corresponding to the file that is stored in the temporary data store;
    causing, by the computing system, the modified version of the data corresponding to the file to be stored in the object of the primary data store via the local file system;
    causing, by the computing system, the modified version of the data corresponding to the file to be removed from the temporary data store; and
    causing, by the computing system, updated metadata of the modified version of the data corresponding to the file to be stored in additional memory of the first entity that is accessible to the local file system.

2. The method of claim 1, wherein:
    the computing system receives the request to access the data corresponding to the file from a computing device of a user, wherein the computing device corresponds to the first entity and has access to the local file system; and the computing system includes a data processing controller executing on one or more servers of the first entity.

3. The method of claim 2, wherein the local file system and the computing device are associated with a premises of the first entity, the premises of the first entity including at least one server computer that executes an instance of the local file system and including the temporary data store that is accessible to the local file system.

4. The method of claim 3, wherein:
in response to receiving the request to access the data corresponding to the file, the computing system determines at least one of one or more commands or one or more application programming interface calls of the local file system to cause the local file system to retrieve the metadata from additional memory of the first entity and retrieve the data corresponding to the file from the primary data store based on the metadata; and
sending, by the computing system, the at least one of one or more commands or one or more application programming interface calls to the local file system.

5. The method of claim 4, wherein the computing device displays one or more user interfaces including a plurality of user interface elements, the plurality of user interface elements including a user interface element corresponding to the file and that is selectable to cause the at least one of the one or more commands or the one or more application programming interface calls to be sent to the instance of the local file system being executed by the at least one server computer.

6. The method of claim 3, wherein the modified version of the data corresponding to the file is stored by the primary data store in response to determining that modifications are no longer being made to the data corresponding to the file.

7. The method of claim 6, comprising:
initiating a session of an instance of an application in response to one or more additional requests obtained from the computing device;
wherein modifications are made to the data corresponding to the file according to the one or more computational operations based on input provided during the session to produce the modified version of the file; and
wherein the one or more computational operations correspond to at least one of modifying existing data of the file or adding additional data to the file.

8. The method of claim 7, wherein the instance of the application is executed by at least one of the computing device, the one or more servers, or one or more cloud computing computational services.

9. The method of claim 7, wherein determining that modifications are no longer being made to the data corresponding to the file includes determining that the session of the instance of the application has been terminated.

10. The method of claim 1, wherein causing the modified version of the data corresponding to the file to be removed from the temporary data store is part of a process to dehydrate the data corresponding to the file in the temporary data store that includes storing the updated metadata of the file stored by the local file system and includes producing a stub file during the dehydration process, wherein the stub file indicates at least one of an identifier of the data corresponding to the file or a storage location of the data corresponding to the file in the primary data store.

11. The method of claim 1, wherein:
the data corresponding to the file includes scientific data including at least one of genomic information, genetic information, metabolomic information, transcriptomic information, fragmentiomic information, immune receptor information, methylation information, epigenomic information, or proteomic information; and
at least a portion of the one or more computational operations to produce the modified version of the data corresponding to the file are performed by a bioinformatics pipeline of the first entity.

12. A computing system comprising:
one or more hardware processors; and
memory storing computer-readable instructions that, when executed by the one or more hardware processors, cause the one or more hardware processors to perform operations comprising:
obtaining a request to access data corresponding to a file, wherein data corresponding to the file is stored in a primary data store and the computing system is at least one of maintained, controlled, or administered by a first entity and the primary data store is at least one of maintained, controlled, or administered by a second entity that includes a cloud storage service provider;
accessing, using a local file system, metadata corresponding to the file, wherein the metadata indicates an object of the primary data store that includes the data corresponding to the file;
causing one or more requests to be sent based on the metadata and by the local file system to the primary data store to retrieve the data corresponding to the file;
causing the data corresponding to the file to be stored in a temporary data store of the first entity and that is accessible to the local file system;
causing one or more computational operations to be performed with respect to the data corresponding to the file to produce a modified version of the data corresponding to the file that is stored in the temporary data store;
causing the modified version of the data corresponding to the file to be stored in the object of the primary data store via the local file system;
causing the modified version of the data corresponding to the file to be removed from the temporary data store; and
causing updated metadata of the modified version of the data corresponding to the file to be stored in additional memory of the first entity that is accessible to the local file system.

13. The computing system of claim 12, wherein:
the request to access the data corresponding to the file is received from a computing device of a user, wherein the computing device corresponds to the first entity and has access to the local file system;
the computing system includes a data processing controller executing on one or more servers of the first entity;
the local file system and the computing device are associated with a premises of the first entity, the premises of the first entity including at least one server computer that executes an instance of the local file system and including the temporary data store that is accessible to the local file system.

14. The computing system of claim 13, wherein the premises is one of a plurality of premises of the first entity, individual premises of the plurality of premises corresponding to a respective local file system, including at least one respective server computer that executes the respective local file system, and including a respective temporary data store that is accessible to the respective local file system.

15. The computing system of claim 14, wherein the memory stores additional computer-readable instructions that, when executed by the one or more hardware processors, cause the one or more hardware processors to perform additional operations comprising:
  causing the updated metadata of the file to be stored in additional memory of an additional premises of the plurality of premises;
  obtaining an additional request to access the modified version of the data corresponding to the file from a computing device of the additional premises; and
  causing one or more additional requests to be sent based on the updated metadata and by an additional file system of the additional premises to the primary data store to retrieve the modified version of the data corresponding to the file.

16. The computing system of claim 15, wherein the modified version of the data corresponding to the file is stored in a same object as an initial version of the data corresponding to the file and the updated metadata includes a storage location of the primary data store corresponding to the object.

17. The computing system of claim 16, wherein the memory stores additional computer-readable instructions that, when executed by the one or more hardware processors, cause the one or more hardware processors to perform additional operations comprising:
  causing the modified version of the data corresponding to the file to be stored in an additional temporary data store of the additional premises that is accessible to the additional file system;
  causing an additional modified version of the data corresponding to the file to be stored by the additional local file system in the same object of the initial version of the file in the primary data store; and
  causing additional updated metadata of the file to be stored in respective storage devices of the plurality of premises.

18. The computing system of claim 17, wherein the memory stores additional computer-readable instructions that, when executed by the one or more hardware processors, cause the one or more hardware processors to perform additional operations comprising:
  causing the additional modified version of the data corresponding to the file to be removed from the additional temporary data store; and
  producing the additional updated metadata of the additional modified version of the data corresponding to the file in conjunction with causing the additional modified version of the data corresponding to the file to be removed from the additional temporary data store.

19. One or more computer-readable storage media storing computer-readable instructions that, when executed by one or more hardware processors, cause the one or more hardware processors to perform operations comprising:
  obtaining a request to access data corresponding to a file, wherein the data corresponding to the file is stored in a primary data store and the one or more hardware processors are part of a computing system that is at least one of maintained, controlled, or administered by a first entity and the primary data store is at least one of maintained, controlled, or administered by a second entity that includes a cloud storage service provider;
  accessing, using a local file system, metadata corresponding to the data corresponding to the file, wherein the metadata indicates an object of the primary data store that includes the data corresponding to the file;
  causing one or more requests to be sent based on the metadata and by the local file system to the primary data store to retrieve the data corresponding to the file;
  causing the data corresponding to the file to be stored in a temporary data store of the first entity and that is accessible to the local file system;
  causing one or more computational operations to be performed with respect to the data corresponding to the file to produce a modified version of the data corresponding to the file that is stored in the temporary data store;
  causing the modified version of the data corresponding to the file to be stored in the object of the primary data store via the local file system;
  causing the modified version of the data corresponding to the file to be removed from the temporary data store; and
  causing updated metadata of the modified version of the data corresponding to the file to be stored in additional memory of the first entity that is accessible to the local file system.

20. The one or more computer-readable storage media of claim 19, wherein the data corresponding to the file and the modified version of the data corresponding to the file are stored in an object of the primary data store, the object having a storage location identifier by which multiple file systems can access data of one or more versions of the data corresponding to the file stored in the object and the object being a source of truth for the data of the one or more versions of the data corresponding to the file.

* * * * *